United States Patent [19]
Flory et al.

[11] Patent Number: 6,009,476
[45] Date of Patent: *Dec. 28, 1999

[54] DEVICE DRIVER ARCHITECTURE SUPPORTING EMULATION ENVIRONMENT

[75] Inventors: Kevin J. Flory, Patterson; James A. Keller, Santa Clara, both of Calif.

[73] Assignee: Diamond Multimedia Systems, Inc., San Jose

[*] Notice: This patent issued on a continued prosecution application filed under 37 CFR 1.53(d), and is subject to the twenty year patent term provisions of 35 U.S.C. 154(a)(2).

[21] Appl. No.: 08/561,354

[22] Filed: Nov. 21, 1995

[51] Int. Cl.⁶ .................................................. G06F 9/00
[52] U.S. Cl. .......................................................... 709/301
[58] Field of Search ................... 712/1; 710/10, 710/8; 714/15; 395/500.43, 500.45; 345/431, 520; 438/296, 300, 303; 709/1, 300–303; 711/206; 713/1, 2, 100

[56] References Cited

U.S. PATENT DOCUMENTS

| | | | |
|---|---|---|---|
| 4,649,479 | 3/1987 | Advani et al. | 709/301 |
| 4,755,478 | 7/1988 | Abernathey et al. | 438/296 |
| 4,855,936 | 8/1989 | Casey et al. | 345/520 |
| 4,885,259 | 12/1989 | Osinski et al. | 438/303 |
| 4,975,829 | 12/1990 | Clarey et al. | 395/500.45 |
| 5,175,855 | 12/1992 | Putnam et al. | 709/301 |
| 5,265,252 | 11/1993 | Rawson, III et al. | 709/301 |
| 5,305,461 | 4/1994 | Feigenbaum et al. | 395/775 |
| 5,337,412 | 8/1994 | Baker et al. | 709/1 |
| 5,339,432 | 8/1994 | Crick | 709/300 |
| 5,352,631 | 10/1994 | Sitaram et al. | 438/300 |
| 5,394,519 | 2/1995 | Bodin | 345/431 |
| 5,412,798 | 5/1995 | Garney | 713/1 |
| 5,459,867 | 10/1995 | Adams et al. | 709/301 |
| 5,459,869 | 10/1995 | Spilo | 713/100 |
| 5,465,364 | 11/1995 | Lathrop et al. | 709/301 |
| 5,491,813 | 2/1996 | Bondy et al. | 395/500 |
| 5,530,858 | 6/1996 | Stanley et al. | 395/650 |
| 5,555,401 | 9/1996 | Allen et al. | 710/8 |
| 5,564,011 | 10/1996 | Yammine et al. | 395/182.13 |
| 5,581,766 | 12/1996 | Spurlock | 713/2 |
| 5,586,324 | 12/1996 | Sato et al. | 713/2 |
| 5,590,314 | 12/1996 | Ueno et al. | 709/301 |
| 5,603,014 | 2/1997 | Woodring et al. | 395/500.43 |
| 5,613,123 | 3/1997 | Tsang et al. | 713/1 |
| 5,675,762 | 10/1997 | Bodin et al. | 711/206 |
| 5,717,903 | 2/1998 | Bonola | 395/500.45 |
| 5,781,797 | 7/1998 | Crick et al. | 710/10 |

Primary Examiner—Meng-Ai T. An
Assistant Examiner—John Follunsbee
Attorney, Agent, or Firm—Gerald B Rosenberg; New Tech Law

[57] ABSTRACT

A device driver architecture that couples an operating system to a computer interface of a controller device that includes a plurality of functional sub-elements. The device driver includes a plurality of operating system interface objects each presenting an operating system interface (OSI) to the operating system, a plurality of computer interface objects each providing for the generation of programming values to be applied to the computer interface to establish the operating mode of a respective predetermined sub-element of the controller device, and a device driver library of processing routines callable by each of the plurality of operating system interface objects to process data and generate calls to the plurality of computer interface objects in predetermined combinations. The device driver library enables the selection of an execution contexts within which to define the generation and application of the programming values to the computer interface. The state of the hardware interface is virtualized and maintained in discrete contexts, allowing for application specific, dynamic alteration of the state of the hardware interface through essentially context switching private to the device driver in response to selected operating system events.

12 Claims, 8 Drawing Sheets

DEVICE DRIVER ARCHITECTURE SUPPORTING EMULATION ENVIRONMENT

BACKGROUND OF THE INVENTION

1. Field of the Invention

The present invention is generally related to the design of device drivers utilized in computer operating systems to define and establish an interface between the core operating system and typically hardware devices and, in particular, to a modular device driver architecture providing a virtualized, context switchable interface environment within which to operate typically hardware devices in support of operating system functions, specifically including information display functions.

2. Description of the Related Art

In conventional computer systems, software operating systems provide generalized system services to application programs, including utility and daemon programs. These system services conventionally include access to whatever individual hardware peripheral devices, each generally presenting a well defined hardware interface to the computer system, may be attached directly or indirectly to the computer system. Device drivers, implemented as software modules or components that can be integrated into an operating system, are typically used to provide well defined software application program interfaces (APIs) to the operating system and application programs for each of the hardware interfaces. Device drivers often provide a degree of device independence or virtualizing that may simplify the interaction of an application program or operating system with the specifics of a particular class of hardware interface, such as a video controller. Conventionally, for each implementation underlying a particular hardware interface, a specific device driver is used to implement an otherwise common API that is presented to the application programs and operating system.

A number of problems are inherent in conventional device driver designs. First, conventional device drivers are specific to a particular hardware interface and the function of the underlying device or controller system. Thus, whenever a new or different version of a hardware controller is produced, a new device driver equally specific to the new or different hardware must also be developed. Where there are many different versions of a hardware device, a generally like number of device drivers must be developed. Alternately, single combination device drivers may be constructed to support multiple versions or types of devices. Such device drivers typically incorporate multiple device specific drivers that are otherwise substantially independent of one another into single binary file.

The effective number of device drivers needed to support a particular piece of hardware is also dependant on the number and differences in the operating system environments within which the hardware is to be used. In all but the most closely related operating systems, a substantial redevelopment of the device driver is required to both provide for the proper ability to incorporate the device driver into a particular operating system and, perhaps more significantly, to provide a logically similar though often entirely different API to the operating system and applications. Usually, the detailed definition of the API of the device driver governs the detailed design of the device driver itself. Consequently, device drivers for the same hardware but for different operating systems are often almost completely independently developed.

Another consideration that affects the number of device drivers that are required to support a particular hardware controller arises from the nature of other hardware and systems that are connected to a particular controller. Again, to provide flexibility in the detailed construction of computer systems, a hardware controller may be capable of supporting a number of distinctly different modes of operation. For example, a video controller may be able to support a significant range of video display resolutions and color depths. However, the range may be constrained by direct limitations such as the amount of video RAM actually implemented on a particular video controller and indirectly by the maximum vertical and horizontal frequencies of an attached video display. The requirements of particular applications may also drive the selection of a particular mode of operation that must be supported by a device driver. Conventionally, a number of device drivers are provided with the hardware controller, each supporting a different set of one or more modes of operation. One of the provided device drivers must therefore be selected for operating system incorporation based directly on the configuration of the particular computer system. Aside from the difficulties of picking a device driver that supports the desired set of operating modes, a substantial difficulty exists in preemptively determining the variety of modes that different individual device drivers are to support. Although the individual drivers may differ only by some modest amount, their number may be significant in terms of development.

A second problem, in part a consequence of the first, is that each device driver must be thoroughly tested in the full variety of environments that the device driver may be used in to ensure commercially acceptable operation. Conventionally, device drivers are essentially monolithic software modules that are incorporated bodily into the operating system. As such, testing of even minor variants of a device driver for a particular operating system requires that the full suite of operational function and application compatibility tests be run to verify correct operation of the device driver. Selective functional testing is generally inappropriate due to the real possibility of collateral operational errors arising from any modification of a monolithically coded device driver. Given the substantial number of effectively different device drivers conventionally supported for a reasonably complex hardware controller and the size and substantial extent of corresponding test suites, the testing of device drivers represents a substantial expense and a very significant delay in bringing new or improved versions of a product to market.

A third problem with conventional device driver designs is that they provide for a substantially static type of hardware controller management. In general, device drivers establish a single set of operating parameters for the hardware controller being managed by the device driver. The operating system and the application programs executing on the computer system all must accept the parameters of this static mode or essentially fail to operate correctly.

In limited instances, a conventional device driver may make some modes available or visible to application programs. To make use of these modes, the device driver therefore relies on application programs to have essentially compiled-in hardware dependencies. In such cases, the application programs may invoke a mode change, though with potential detrimental effects on the other executing programs that, even if capable of invoking a mode switch, are effectively unaware of any such switch.

Some typically multi-tasking operating systems can perform limited dynamic hardware controller mode switching, though only through an operating system supported state change. In these cases, the operating system essentially reloads the state of the device driver and hardware controller consistent with the state of a new mode of operation. However, there is no direct relation between the applications executing and the state of the device driver and hardware controller. Again, any executing applications are largely if not completely unaware of any mode switch. Consequently, the selected mode may be optimal for some executing application, but not necessarily the application with current execution focus.

SUMMARY OF THE INVENTION

Thus, a general purpose of the present invention is to provide a flexible, modular device driver architecture that can provide independent hardware configuration options on a dynamic reconfiguration basis.

This is achieved in the present invention by providing a device driver architecture that operates to couple an operating system, provided in the memory of a computer system having a processor, to a computer interface of a controller device that includes a plurality of functional sub-elements. The device driver includes a plurality of operating system interface objects each presenting an operating system interface (OSI) to the operating system, a plurality of computer interface objects each providing for the generation of programming values to be applied to the computer interface to establish the operating mode of a respective predetermined sub-element of the controller device, and a device driver library of processing routines callable by each of the plurality of operating system interface objects to process data and generate calls to the plurality of computer interface objects in predetermined combinations. The device driver library enables the selection of execution contexts within which to define the generation and application of the programming values to the computer interface.

An advantage of the present invention is that the state of the hardware interface and, correspondingly, the state of the controller that presents the hardware interface, is virtualized and maintained in discrete contexts. Operational features or modes of a controller that must otherwise be handled or managed by individual application programs can be virtualized by operation of the present invention. The present invention provides for application specific, dynamic alteration of the state of the hardware interface through essentially private context switching implemented by operation of the device driver. Selected operating system events are modified or trapped to initiate the creation of new contexts and the dynamic switching between contexts by the device driver.

Another advantage of the present invention is that the device driver provides for a comprehensive optimization of the functions supported through the device driver by the controller. The device driver provides for the virtualization of the API call interfaces supported by the device driver. Virtualization of the call interfaces through the use of operating system interface objects provides specific support for independently defined APIs and the translation of functionally equivalent calls to be supported by substantially common execution streams.

A further advantage of the present invention is that virtualization of the call interfaces of the device driver architecturally establishes a common evaluation of API calls and their parameters, essentially eliminating any requirement for subsequent parameter checking within the common execution streams. The resultant substantially linear execution streams, coupled with pointer referencing of context data structures ensures efficient execution performance while enabling substantially greater functionality than achievable in conventional monolithic device drivers.

Yet another advantage of the present invention is that the device driver provides for context dependant alteration of the substantially linear execution streams. Conversion functions required to enable or support switching between contexts are supported by linking the functions directly into the execution streams so as to minimize repetitive testing to determine whether a conversion function need be performed.

A still further advantage of the present invention is that the device driver incorporates dynamic loading and configuration of essential functional objects necessary or optimal to support the particular controller configuration accessible through the hardware interface. The device driver responds to encoded configuration data obtained through the hardware interface or otherwise from the controller to identify the independent functional sub-elements constituting the controller, determines a corresponding set of hardware interface objects appropriate to support the sub-elements and dynamically loads and links in the object set as part of the initialization of the device driver.

Still another advantage of the present invention is that the device driver supports a variety of hardware interface objects that are programmable with respect to certain functional or operational aspects. Based on the encoded configuration data obtained through the hardware interface or otherwise from the controller, the device driver identifies and loads configuration data from system memory to program the hardware interface objects with operational configuration data defining details of how the hardware interface objects will support their corresponding sub-elements.

Yet still another advantage of the present invention is that the device driver provides an established architecture within which new hardware interface objects can be developed in substantial isolation from other hardware interface objects and other architectural components of the device driver. The architectural design of the hardware interface objects themselves also allows substantial configuration revision and enhancement to be performed through redefinition of the operational configuration data used to program the corresponding hardware interface objects. Modification of a device driver to support a revised or new controller sub-element may be limited to simply editing a configuration data file as oppo3ed to preparing source code modifications to the sub-element corresponding hardware interface object. In any case, compatibility testing can be appropriately limited to testing the particular hardware interface object that supports a revised or new sub-element of a controller.

A yet still further advantage of the present invention is that the device driver provides for modification of the operating system to enforce a consistent reporting of the color depth currently supported by a video display controller. Different color depth contexts are established for the set of executing application with each context corresponding to the maximum acceptable color depth of one or more executing applications. As context is changed and where the maximum color depth of an application exceeds the color depth capabilities of the video display controller, color depth conversion functions linked into appropriate linear execution streams provide for display data color depth conversion.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
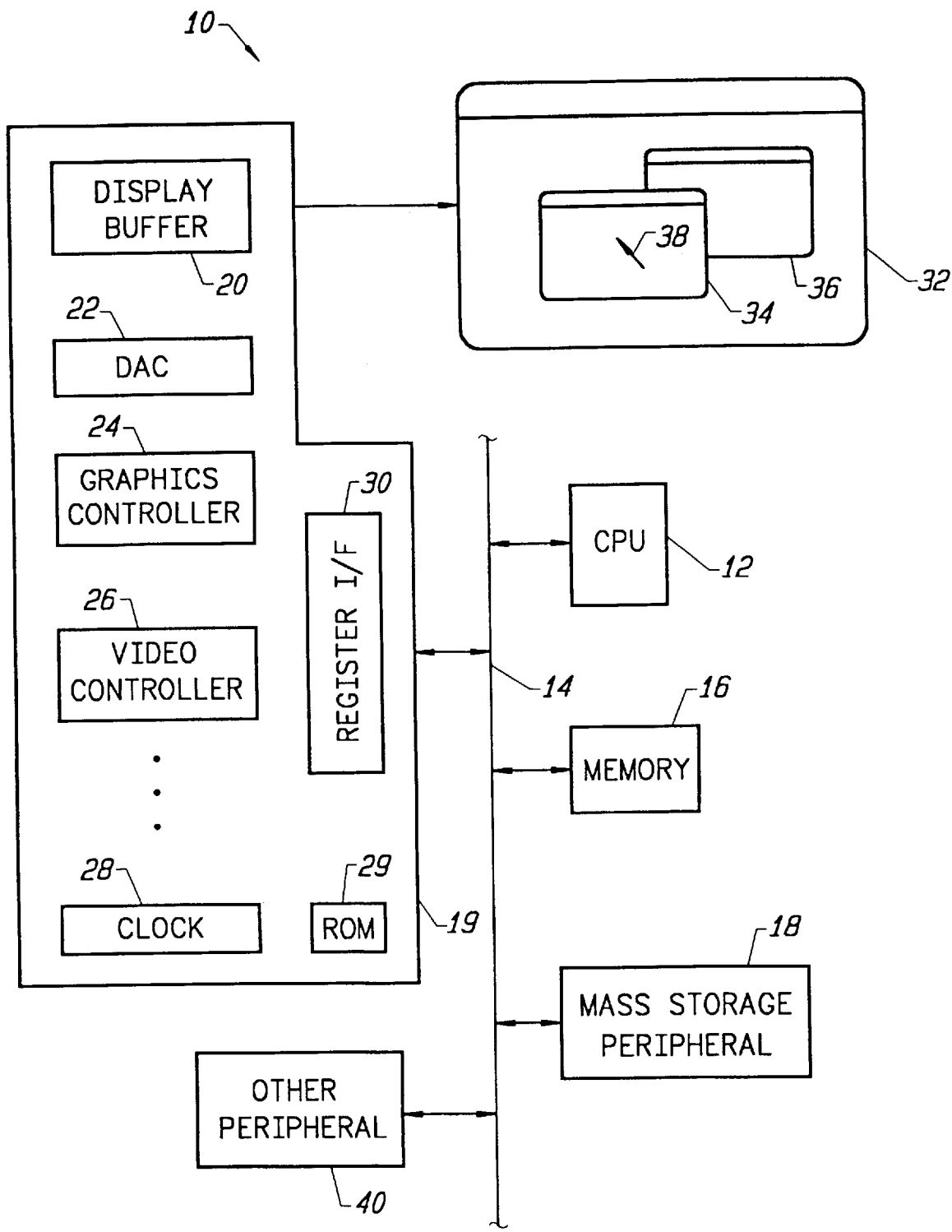
FIG. 1 is a schematic block diagram of a computer system constructed in accordance with the present invention.

I. Hardware System Overview:

A computer system 10, suitable for utilization of the present invention, is shown in FIG. 1. The computer system 10 preferably includes a central processing unit (CPU) 12 coupled through a system data bus 14 to a main memory 16 and a mass storage peripheral 18, preferably including a disk drive controller and hard disk drive unit. For purposes of the present invention, the operation of the mass storage peripheral 18 is sufficient if the supported function permits the reading of a certain executable, data and configuration files from a non-volatile resource. Thus, the mass storage peripheral 18 may be a communications controller providing access to a external or remote device or system that provides for the storage of data readable by the computer system 10 typically in a file oriented organization.

A video display controller 19 is also provided as a peripheral device coupled to the system bus 14. The hardware implementation of the video display controller 19 is generally conventional in nature for purposes of the present invention. However, in the context of the present invention, the video controller 19 is uniquely described as a collection of logically independent sub-elements that together comprise the controller 19. The sub-elements are logically distinguished by their functional identity particularly with regard to generally independent operational programmability. That is, the functional divisions of the hardware implementation of the controller 19 largely define the separate sub-elements of the controller 19 for purposes of the present invention.

Another basis for distinguishing the sub-elements is the grouping of functions based upon a commonality in the manner of programming the corresponding sub-element as a consequence ultimately by the programmed execution of the CPU 12. Thus, as generally indicated in FIG. 1, the sub-elements of the video controller 19 preferably include, but are not limited to, a video display buffer 20, a digital-to-analog converter (DAC) 22, a video graphics accelerator 24, a video controller 26, a programmable clock generator 28, a hardware cursor controller, and a coder-decoder unit (CODEC). Each of these sub-elements of the controller 19 are relatively independently programmable through a hardware register interface 30 that is appropriately coupled to the system bus 14. Thus, the CPU 12 may program and obtain information from the sub-elements 20, 22, 24, 26, 28. The register interface 30 and one or more of the sub-elements may, as a practical matter, be physically resident on a single integrated circuit. Co-residency of sub-elements on a single integrated circuit or the possibility that sub-elements are accessible through other sub-elements does not affect functionally distinguishing sub-elements from one another.

By the programming of the sub-elements 20–28, a video display 32 is supported for the presentation of textual and graphical information. In a preferred embodiment of the present invention, multiple display windows 34, 36 are supported in combination with a pointer 38 that can be used to select the current active or "focus" display window visible on the display 32. A display window 34, 36 can obtain the current focus through a number of discrete events. These events include the launching of a new application program for execution by the computer system 10. By default, the main window of a newly launched application obtains the current focus of the display 32. The pointer 38 can also be utilized to select a window 34, 36 that is to receive a focus on the occurrence of a mouse click, for example. Finally, the display window 34, 36 may receive focus upon termination of another application. In each of these circumstances a focus event is produced upon which the CPU 12, through the execution of the operating system, can act.

Other peripherals 40 may also exist as components of the computer system 10. These other peripherals 40 may include complex controllers supporting audio, real-time video, and other complex multi-function operations alone or in combination with one another. Such complex controllers may be effectively supported by the present invention provided that the functional operation and organization of the controller is reasonably sub-divided as a multiplicity of functional elements that are programmable directly or indirectly by the CPU 12. For example, a high-performance audio subsystem presenting wavetable synthesis, FM synthesis, an equalization controller, a reverberation controller and multichannel amplifier sub-elements all directly or indirectly represented though a register interface presented to the system bus 14 can be optimally supported by the present invention.

Figure 2:
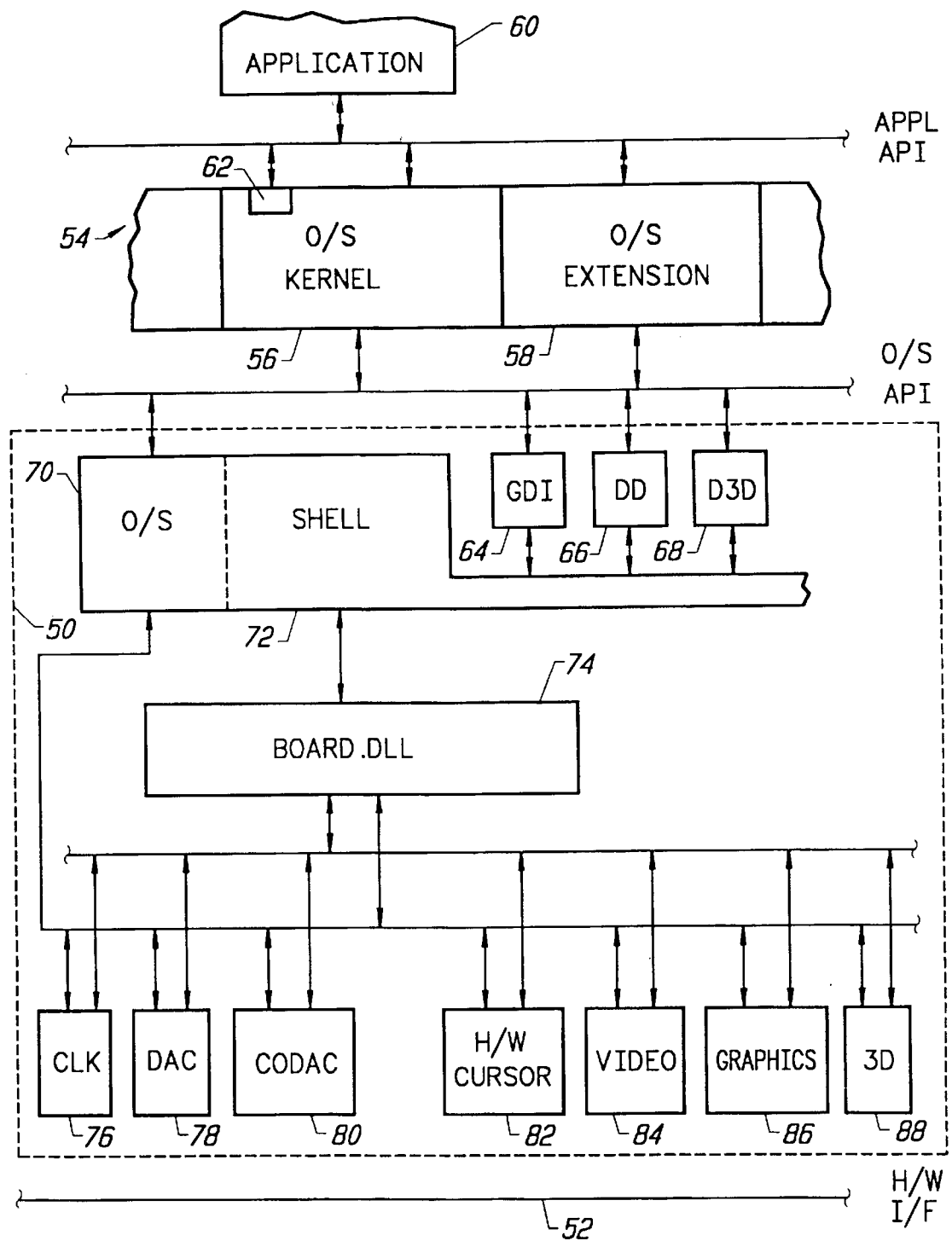
FIG. 2 provides a schematic block diagram of the architectural configuration of the present invention during initialization of the device driver of the present invention.

II. Software System Overview:

While the present invention may readily support any peripheral controller that has any number of sub-elements, the present invention may be best understood as applied in the preferred embodiment to the support and control of the video display controller 19. Referring now to FIG. 2, a preferred device driver embodiment of the present invention 50 is shown positioned between the hardware interface, representing the logical connection of the device driver to the register interface 30 of the video display controller 19, and an operating system layer 54. The operating system layer 54 typically includes an operating system kernel 56 and potentially one or more operating system extensions 58 that add some basic operating system level functionality. Finally, the operating system layer 54 may in turn support one or more application programs 60.

In operation, the application programs 60 obtain operating system layer 54 support services through an application program interface (API) that is presented effectively as a set of execution entry points that can be called by the application 60. In accordance with an embodiment of the present invention, a small sub-set 62 of the operating system kernel API call points are modified during the initialization of the device driver 50. These modified call points include the entry point routine that reports a window focus change event to an application 60 and the entry point routine that reports the current color depth of the display 32 back to the application 60. The focus change event is preferably modified to include a API call to an operating system extension 58 that provides for additional event processing in response to a focus change event. This additional event processing includes performing a configuration retrieval to obtain data quantifying the execution environment of an application that is to be launched generally as a consequence of the focus event. The data retrieved preferably includes the screen resolution and color depth configuration desired for the application being launched.

The modifications of the color depth reporting routine are made specifically to ensure that the maximum color depth requested by any application 60 is reported to the application 60 as being the current color depth of the display 32. Thus, in accordance with the preferred embodiment of the present invention, all applications 60 execute against a completely virtualized representation of the display 32 particularly with respect to color depth. That is, the device driver 50 provides full support for whatever color depth is requested by an application 60, regardless of whether the requested color depth exceeds the maximum color depth that can be handled by another application 60 or, indeed, the maximum color depth of the display 32 itself.

A. Device Driver Software Architecture—Upper Level:

The kernel layer 54 connects to the device driver 50 through an operating system API (O/S API) that provides the operating system kernel 56 and any extensions 58 with entry points into the device driver 50. Within the device driver 50, the O/S API is supported primarily by a number of operating system interface modules including a Graphics Display Interface (GDI) module 64, a Direct Draw (DD) module 66, any number of other modules 68, each representing a present or future defined APIs, such as Direct 3D (D3D). Additional API entry points are provided by an operating system (O/S) module 70, a graphics interface (GRX) module 71, and a shell module 72. These modules together present essentially all of the callable entry points that make up the O/S API of the device driver 50.

The shell module 72 is the initial component of the device driver 50 loaded into the memory 16 as part of the initialization of the operating system kernel 56 during system startup. In a conventional operating system such as Microsoft MS-Windows '95™, the operating system kernel 56 will load the shell module 72 into memory 16 as a consequence of a reference in a standard initialization configuration file or data base, such as the MS-Windows '95 registry services.

An initialization entry point provided by the shell module 72 permits the operating system kernel 56 to initiate the device driver specific initialization of the device driver 50. As part of this initialization, the shell module 72 determines a Board driver, set of hardware interface modules, and compliment of operating system interface modules that are required to complete the implementation device driver 50 to support the O/S API that will be presented by the device driver 50 to the operating system layer 54. In a preferred embodiment, these determined additional modules, if not statically linked to the shell module 72, are dynamically loaded and then logically linked into the device driver 50.

In order to establish a call interface to the O/S API as needed to obtain support services for initialization of the device driver 50, at least the operating system module 70 loads as an integral portion or component of the shell module 72. Preferably, the GRX module 71 is also loaded with the shell module 72. As a matter of practical convenience, other commonly used and default operating system interface modules may also be statically linked to the operating system module 70.

Particularly as demonstrated by the GDI 64, DD 66, and D3D 68 modules, the device driver 50 of the present invention preferably implements the O/S API of the device driver 50 in segregated units that are specific to particular portions of the operating system kernel 56 and/or operating system extensions 58. Thus, in the preferred embodiment, the GDI module 64 preferably supports the flat model DIBEngine driver interface predefined by Microsoft for the MS-Windows '95™ product. Similarly, the Direct Draw module 66 supports the hardware independent interface for the standard direct draw API. The D3D module 68 will support the announced Microsoft Direct 3D API for Windows '95™. Documentation for each of these APIs is available as part of the Microsoft Software Development Kit (SDK) and the Microsoft Device Drivers Kit (DDK), available as commercial products of Microsoft, Inc., Redmond, Washington. The dynamic loading capability of the present invention thus allows the comprehensive API support presented by the device driver 50 to be readily tailored and extended through the dynamic loading of additional operating system interface modules.

The shell module 72, including the O/S and GRX modules 70,71, presents both conventional and proprietary API interface parts to the operating system layer 54 as needed to support both conventional and proprietary support functions through the operation of the device driver 50. The conventional API part includes an initialization entry point that allows the operating system layer 54 to initiate the initialization of the shell module 72 upon loading into the memory 16. A generally standard termination call entry point is also provided. This entry point allows the operating system layer 54 to signal the device driver 50 that shutdown of the operating system layer 54 is imminent and that an orderly termination of the device driver is required.

The proprietary API entry points presented by the shell module 72 include entry points providing for the reading and writing of data defining the current desktop presented on the display 32, the current viewport and certain data defining the operation of the device driver 50. This latter information may include setting the current physical color depth of the display 32, the current color and pattern of the display pointer 38, and a number of largely video hardware specific aspects such as the interlace, video sync type, video fast scroll, and color enable options of the device driver 50.

Finally, the operating system module 72 provides the device driver support routines that call the operating system layer 54 to obtain basic operating system services. In the preferred embodiment of the present invention, these system services include memory allocation, freeing of previously allocated memory, the loading and unloading of dynamic link libraries, memory management functions such as enabling a memory object to be executable or to lock a memory object in real memory, to disable the executable or lock status of memory objects, to read and write data to defined I/O addresses, and to open, read and close named data files typically as stored by the mass storage peripheral 18.

B. Device Driver Software Architecture—Lower Level:

The shell module 72 also provides for a dynamic configuration of the device driver 50 with respect to the particular instance of the video display controller 19. While any of a number of functionally similar video display controllers 19 may be utilized in the computer system 10, the device driver 50 of the present invention provides for the dynamic selection and inclusion of a board driver 74 into the device driver 50 to optimally support the hardware specifics of the particular video display controller 19. The shell module 72 selects a particular board driver 74, from among any number of variants, that corresponds to the major aspects of the particular video display controller 19. In practical terms, the major aspect of a particular video display controller 19 is the specific architecture of the integrated circuit graphics accelerator chip or chip set used in the implementation of the controller 19. Thus, a single board driver 74 may correspond to a well defined family of specific variants of the display controller 19. Other board drivers can be constructed to correspond to other families of controllers of different definition.

The board driver 74 provides for an additional layer of dynamic configuration of the device driver 50 by the selective support of a set of hardware interface modules. These hardware interface modules are dynamically loadable as component elements of the device driver 50 and correspond substantially to the individual sub-elements of a particular implementation of the video display controller 19. In a preferred embodiment of the present invention, the set of hardware interface modules include a Clock Module 76, DAC Module 78, CODEC Module 80, Hardware Cursor Support Module 82, Video Module 84, Two Dimensional Graphics Control Module 86, and Three Dimensional Graphics Control (3D) Module 88. The particular set of hardware interface modules dynamically loaded in to the device driver 50 is determined by the board driver 74 in correspondence to the specific sub-elements present in the implementation of the video display controller 19. That is, dependant upon the specific implementation of the Clock sub-element 28, a particular and corresponding clock module 76 is identified by the board driver 74 and dynamically loaded into the device driver 50. Consequently, for example, inclusion of a new version of a DAC sub-element 22 into the otherwise generally existing design of the video display controller 19 can be immediately accommodated by a corresponding revision in the functionality of essentially only the DAC module 78 of the device driver 50. Thus, the partitioning of sub-element specific aspects of the device driver 50 into dynamically loadable modules allows significant revisions in the ultimate configuration performance and operation of the device driver 50 to be made in isolation from the rest of the device driver 50. Such hardware specific changes are also effectively isolated from the other hardware interface modules and from the higher layers of the device driver 50. Testing of a device driver 50 configuration for a new version of the display controller 19 can therefore be made with confidence against only the particular new or revised hardware interface module or modules.

As a practical matter, some of the hardware interface modules may be statically linked to the board driver 74. Where a basic compliment of modules will always or almost always be used with a particular board driver 74, an optimization is gained by loading the modules together with the board driver 74. Subsequent use of a statically linked module can also be effectively overridden by providing a dynamically linkable module for supporting the corresponding sub-element. Dynamically loaded modules are preferably used over corresponding statically linked modules.

Figure 3:
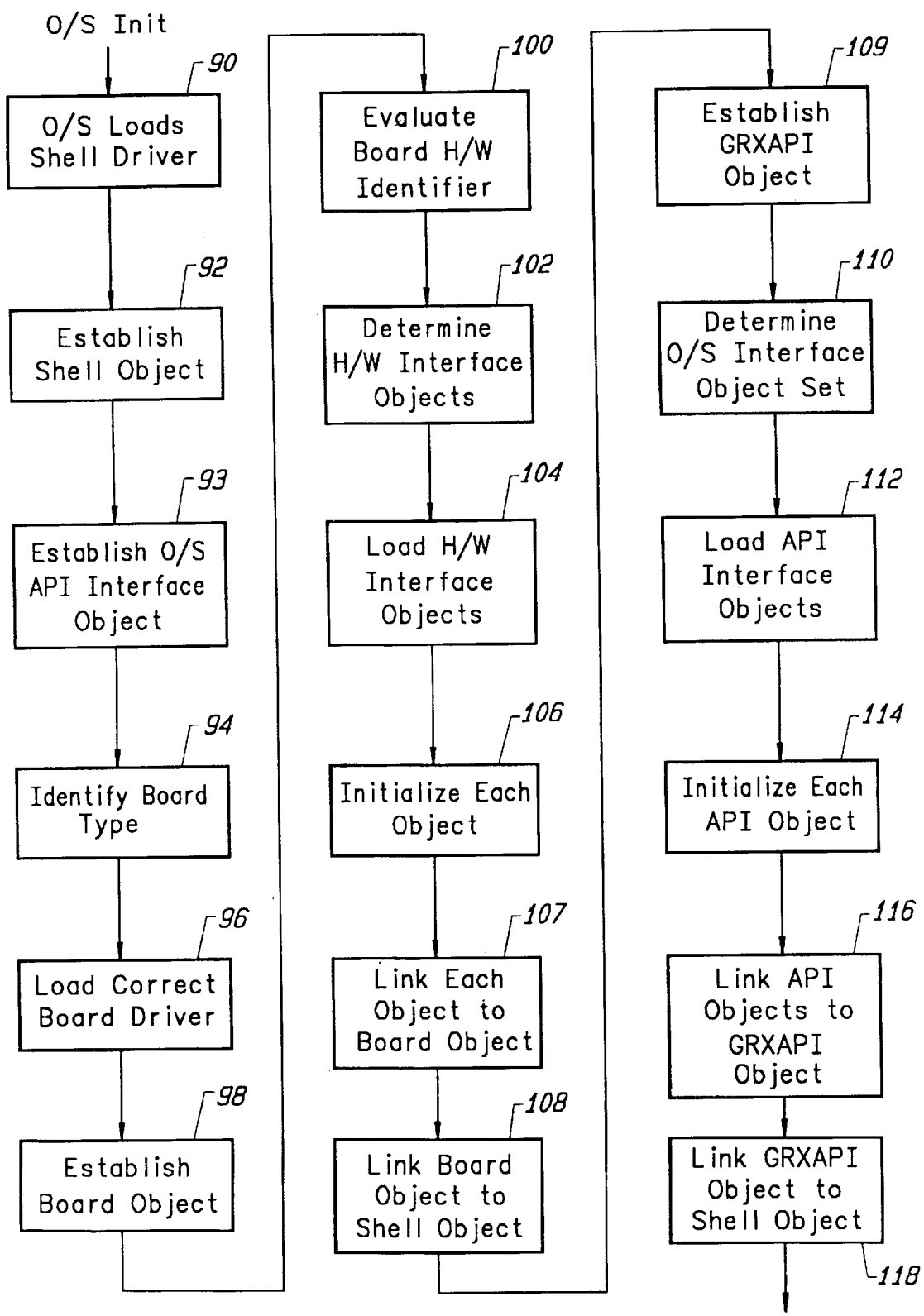
FIG. 3 provides a flow diagram detailing the initialization of the present invention.

III. Device Driver Initialization:

The process of initializing the device driver 50 of the present invention is generally illustrated in FIG. 3. This initialization process will be described with regard to the preferred embodiment which operates with the MS-Windows '95™ operating system.

A. Initial Upper Level Initialization:

In connection with the conventional execution of the operating system initializations, the shell module 72 is loaded 90 into memory 16 as a consequence of a conventional system driver reference in the registry services database file. Once resident in memory, a call is made to the initialization entry point of the shell module 72 to initiate the device driver dependent initializations. The initialization routine of the shell module 72 provides for the creation 92 of and a shell object 126 (SHELLOBJ) and then an operating system object 128 (OSOBJ) at 93.

The shell object is used as a top level data structure that logically links together the structure of the device driver 50. The significant elements of the shell object are identified in Table I.

TABLE I

```
SHELLOBJ
{
    /* global state flags */
    InitFlags
    ModeSetFlags
    /* public data */
    ViewportXext
    ViewportYext
    ViewportLeft
    ViewportTop
    ViewportRight
    ViewportBottom
    DesktopXext
    DesktopYext
    Pixel Depth
    ColorType
    HorzFreq
    VertFreq
    Interlace
    SyncTypes
    CursorColor
    PanlockOn
    FastScrollRate
    ColorEnableOn
    VideoMemoryOffset
    VideoMemoryPool
    OffscreenBitmapCache
    /* pointers to list of operating system and hardware
       interface objects with head and tail pointers to
       facilitate pointer list management and pointers
       to Board and GRX objects */
    FirstObj
    BoardObj
    GrxApiObj
    LastObj
    /* storage for the board identifier */
    BoardData
```

TABLE I-continued

```
/* shell library routine entry points */
ShellModeSet
ShellSetDPMSState
ShellModeDump
ShellGetDesktop
ShellValidateDesktop
ShellGetViewport
ShellValidateViewport
ShellSetViewportPos
ShellStrlen
ShellStrtok
ShellStrncmpi
ShellStrcpy
ShellStrcat
ShellPrintStr
ShellScanStr
ShellDebugOut
ShellStringOrdinal
ShellSkipWhitespace
ShellSkipToAfterNull
ShellSkipToAfterCrLf
ShellReadFileIntoBuffer
ShellGetBufferedSection
ShellReplaceCrLfWithNull
ShellParseSection
ShellLoadObject
ShellUnloadObject
ShellGetModeFileName
ShellRegisterBoardObject
ShellUnregisterBoardObject
ShellOffscreenBitmapInit
ShellOffscreen BitmapRegisterMove
ShellOffscreenBitmapUninit
ShellOffscreenBitmapCreate
ShellOffscreenBitmapDestroy
ShellOffscreenBitmapCache
ShellOffscreenBitmapFlush
ShellOffscreenBitmapFlushAll
ShellOffscreenBitmapCleanBand
ShellOffscreenBitmapCleanAll
ShellMemoryPoolCreate
ShellMemoryPoolDestroy
ShellMemoryPoolSetInform
ShellMemoryPoolAlloc
ShellMemoryPoolAllocMoveable
ShellMemoryPoolAllocFixed
ShellMemoryPoolFree
ShellMemoryPoolCompact
ShellMemoryPoolEnumerate
ShellMemoryPoolGetData
ShellBandListCreate
ShellBandListDestroy
ShellBandListFindByHeight
ShellBandListEnumerate
ShellBandListAlloc
ShellBandListFree
ShellRectPoolCreate
ShellRectPoolDestroy
ShellRectPoolAlloc
ShellRectPoolFree
ShellRectPoolGetData
}
```

As indicated, the shell object includes some global flag data, API call entry points, pointers to the high-level software objects that represent components of the device driver 50, and a number of shell library routines or functions used to support the internal operation of the device driver 50.

The operating system object provides API call access to operating system layer 54 support functions. The elements of the operating system object are identified in Table II.

TABLE II

```
OSOBJ
{
    /* General Purpose Operating system API calls
        supported */
    OsMemoryAlloc
    OsMemoryFree
    OsLoadDLL
    OsUnloadDLL
    OsGetModuleHandle
    OsGetProcAddress
    OsGetModuleProcAddress
    OsMapPhysicalAddr
    OsMakeSelectorUse32
    OsCopyAddrMpping
    OsMakeExecutable
    OsMakeReadWrite
    OsMakeSelectorAlias
    OsFreeSelectorAlias
    OsOutputDebugString
    OsUnmapPhysicalAddr
    OsGetSystemDesktop
    OsGetSystemViewport
    OsGetSystemTickCount
    OsFileFind
    OsFileOpen
    OsFileClose
    OsFileRead
    OsFileWrite
    OsFileSeek
    /* platform specific utility functions */
    OsReadWord
    OsWriteWord
    OsReadString
    OsWriteString
    OsReadIOByte
    OsReadIOWord
    OsReadIODword
    OsReadIndexedIOBytes
    OsWriteIOByte
    OsWriteIOWord
    OsWriteIODword
    OsWriteIndexedIOBytes
    OsWriteFixedIOBytes
    OsWriteMemDWord
    OsWriteMemDWordVerify
    OsWriteMemWord
    OsWriteMemWordVerify
    OsWriteMemByte
    OsWriteMemByteVerify
    OsReadMemDWord
    OsReadMemWord
    OsReadMemByte
    OsMemCopy
    /* Low level operating system and Bios call
        functions */
    Os4To3
    OsInt10
    OsFindPCIId
    OsGetPCICfgRegB
    OsGetPCICfgRegW
    OsGetPCICfgRegDW
    OsSetPCICfgRegB
    OsSetPCICfgRegW
    OsSetPCICfgRegDW
    OsGetBoardData
}
```

As indicated by the supported entry points, the O/S object provides a call interface to the operating system layer 54, a call interface to low level and bios functions, and a call interface to platform specific functions. This platform specific call interface represents a number of utility or library routines that serve to hide platform portability details. Although not essentially associated with the other functions of the O/S object, these routines are concentrated here to collect all platform specific calls and functions in one module, thereby limiting platform portability changes substantially to this one module. Furthermore, these routines are generally best implemented using assembler coding, as is the rest of the module.

B. Lower Level Initialization:

The shell module 72 next initiates the dynamic loading of the remainder of the device driver 50. In order to identify the correct board driver 74, the shell module 72 performs an initial assessment 94 of the video display controller 19 to identify a particular board type. A board identifier is preferably read from the controller 19 from a data structure physically resident on the controller 19 and stored in a "BoardData" field of the shell object. In a preferred embodiment, the board identifier is initially stored in a conventional on-board ROM 29 located on the video display controller 19 that is accessible through the register interface 30. Table III provides the preferred structure of the board identifier data structure.

TABLE III

| Board_Identifier: | | |
|---|---|---|
| ID | DW | "DM" |
| Revision | DB | "1" |
| StructureSize | DB | "16" |
| BoardFamily | DB | "0" |
| BoardModel | DB | "0" |
| ControllerFamily | DB | "0" |
| Controller | DB | "0" |
| DacType | DB | "0" |
| PixelClockType | DB | "0" |
| MemoryClockType | DB | "0" |
| MemoryType | DB | "0" |
| VideoType | DB | "0" |
| Oem | DB | "0" |
| BoardDependantInfo | DW | "0" |

The "ID" field provides a static data value that confirms the board identifier structure as compliant with the device driver 50. The "Revision" field is used to define the particular structure of the board identifier structure, should alternate structures be implemented at some future date. The "StructureSize" field defines the size of the structure. The "BoardFamily" field stores a value that can be used to principally identify the board driver 74 that needs to be loaded as part of the device driver 50 required to support this particular instance of the video display controller 19. The values of the board identifier structure, including at least the "BoardFamily" value, are used as a key to perform a key name look-up in a board.dat file. Preferably, the key is formed as a simple concatenation of the significant board identifier field values. The board.dat file is preferably a flat file correlating keys to corresponding file names of specific instances of board drivers 74.

Once a particular board driver 74 is identified 94, the shell module 72 issues a call through the operating system module 70 to load the board driver 74 corresponding to the key value. In response, the operating system layer 54 loads 96 the requested board driver 74 in to the memory 16 and returns a memory pointer to the shell module 72. The initialization entry point of the board driver 74 is then called.

As part of the initialization of the board driver 74, a board object 98 is created. While strictly representing neither an operating system or hardware interface module, the board object establishes a basic data structure form that is used for convenience by the objects that represent the operating system or hardware interface modules. The structure of the board object is provided in Table IV.

TABLE IV

```
BOARDOBJ
{
  OBJHDR
  /* public data */
  ScreenBaseAddress
  MmioBaseAdddress
  VideoMemorySize
  ScreenWidthBytes
  BytesPerPxel
  /* actual modes.dmm file name */
  ModeFileName[128]
  /* pointers to a list of the hardware interface objects -
     also head and tail pointers to facilitate pointer
     list management and to support dynamically
     loaded objects*/
  FirstObj
  MemoryClockObj
  PixelClockObj
  CursorObj
  DacObj
  DrawengObj
  LastObj
  /* public data of board spatial resolution and color
     depth capabilities supported for both Desktops
     and Viewports */
  NumDesktops
  Desktops[]
  NumVieworts
  Viewports[]
  /* pointer to in-memory board identifier structure held
     by the shell object */
  BoardData
  /* board library entry points */
  BoardBlankScreen
  BoardSetViewpotPos
  BoardWaitForVertBlank
  BoardReadReg
  BoardWriteReg
  BoardReadDAC
  BoardWriteDAC
  BoardWriteDACArray
  BoardWriteSerialDeviceStart
  BoardWriteSerialDevice
  BoardWriteSerialDeviceEnd
}
```

As part of the board object initialization, a pointer to the board identifier structure, "BoardData," is obtained 100 from the shell 72. The further fields in the board identifier structure are then examined to identify the particular types of each of the sub-elements present on the video display controller 19. Pre-set coded values are used to identify the particular instance of a sub-element. Preferably, the fields of the Board Identifier in general correspond to the fixed aspects of the sub-elements of the controller 19. For example, the type of a DAC or the type of video memory, VRAM or DRAM, may be provided through the board identifier structure.

Where an aspect of a sub-element is not fixed, as perhaps being field upgradeable, the particular aspect needs to be determined by a conventional method. For example, the amount of display RAM (Video Memory Size) available on the video display controller 19 may be changed once the controller has been placed in operation. The board identifier is, however, static and established at the time of manufacture of the controller 19. Accordingly, a conventional memory scan routine can be utilized to accurately determine the total amount of video memory present on the video display controller 19 in such instances. The display controller 19 may also not have a board identifier 29, perhaps by virtue of being a legacy implementation of the controller 19. A reasonable identification of the sub-elements present on the controller 19 can then be inferred from information obtained through a conventional Int10 Bios call.

The last field in the Board Identifier structure is a "Board-DependentInfo" field. This field provides a word-wide bitmap data area preferably used to flag additional operational characteristics of a particular board type and model. These flags are implementation dependent and uniquely decoded by the board driver 74. In particular, these flag bits may be used to identify detailed configuration options that are not otherwise covered by the other fields of the board identifier. For example, a flag bit may be used to identify the existence of a minor sub-element option that may be used with later versions of the device driver 50.

From the board identifier structure, the board driver 74 thus determines 102 a particular set of hardware interface modules that are required to optimally support the video display controller 19. The board driver 74 then requests the sequential loading 104 of the identified set of hardware interface modules not already statically linked with the board module via the operating system module 70. As each hardware interface module 76-88 is loaded into the memory 16, the initialization routine of each module is called 106 to establish a corresponding software object. In the preferred device driver 50, each hardware interface object is constructed as a data structure containing a common header portion and a hardware dependent portion. The common header portion is preferably an object header data structure (OBJHDR) containing the fields identified in Table V.

TABLE V

```
OBJHDR
{
    /* universal object information */
    HeaderVer
    ObjectVer
    Module
    ObjDataInstance
    RegClassHandler
    ObjectInit
    ObjUnInit
    ModeSet
    SetDPMSState
    /* for debug */
    ModeDump
}
```

The "ObjectVer" field provides a unique identifier specifying the particular implementation of the hardware sub-element supported by the encapsulating hardware interface object. The "Module" field contains the memory pointer returned from the operating system pointing to the memory location of the encapsulated hardware interface module. The "ObjDataInstance" field provides a pointer to the private data area reserved for this instantiation of the hardware interface object. The "RegClassHandler" field defines whether the associated hardware sub-element has interface registers that must be programmed as part of the invocation of a mode set operation. If the value of the field is null, then any required mode set programming is hard coded into the module encapsulated by the hardware interface object. If the field is not null, then the value of the field is the pointer to a structure containing definitions of the register names and interface procedures that can be used in support of a mode change. The structure of the RegClassHandler is shown in Table VI:

TABLE VI

```
RegClassHandler
{
    "Class_Name"
    Class_Index
    Class_Max
    H/W_Interface_Object
    RegClassMap
    Read_reg
    Write_reg
    CmdHandler
}
```

The "ObjectInit" and "ObjUnInit" fields of the object header provide call addresses for initializing and freeing the hardware interface module encapsulated by the present hardware interface object. The "Mode Set" field of an object header establishes the hardware interface module entry point used to signal a mode change to the hardware interface object. In the preferred embodiment, three different calls to this entry point can be made. Each call is distinguished by the operand of the call to specify that a mode set is about to occur, to invoke a mode set, and that a mode set has completed.

Finally the "SetDPMSState" field provides an entry point for servicing changes in the power management state of the system 10 that are specific to a particular module.

Thus, the hardware interface module initialization routines provide for creation of an instance of an encapsulating hardware interface object including storage for the hardware interface dependent portion of the hardware interface object, initializing the object specific fields in this instance of the object, and to obtain allocation of any instance data that is to be maintained private to this instantiation of the hardware interface object. The pointer to the instance data is stored in the "ObjDataInstance" field in the object header. The initialization routine then returns a pointer to the hardware interface object. This pointer is stored 108 in a member field of the board object sub-structure.

A basic hardware interface object, specifically a clock object, is defined in Table VII.

TABLE VII

```
CLOCKOBJ
{
    OBJHDR
}
```

As can be seen, there are no hardware specific functions associated with a clock sub-element. However, the clock frequency is a typical programmable aspect of a clock sub-element and, further, is intimately involved in a mode set operation. Consequently, the RegClassHandler field of the object header structure contains a pointer to a RegClass-Handler structure that includes the necessary register definitions to support access to the interface registers of the clock sub-element that ultimately control the clock frequencies generated on-board the controller 19.

Table VIII illustrates a somewhat more complex object defining, for example, the hardware cursor object.

TABLE VIII

```
CURSOROBJ
{
    OBJHDR
```

TABLE VIII-continued

```
    CursorEnable
    CursorSet
    CursorMove
    CursorSetColor
}
```

As before, an object header is included as an element of the cursor object. The CursorEnable field provides a pointer to an entry point to the hardware cursor interface module to turn the visibility of the hardware cursor on or off depending on the state of a call parameter. The CursorSet field provides a pointer to an entry point 15 that provides for the setting of the cursor pattern to the pattern specified by the operand to the call. The CursorMove field identifies the entry point to a routine for specifying the hot spot of the cursor on the display 32 by X and Y operands provided with the call. The CursorSetColor field identifies the routine used to color expand a two-color cursor presented on the display 32.

Other hardware interface objects include the DAC object 130 (DACOBJ; Table IX), the Video object 136, the Graphics object 138 (DRAWENGOBJ; Table X) and 3D Graphics object 140.

TABLE IX

```
DACOBJ
{
    OBJHDR
    DacBlankScreen
    DacSupportGammaInMode
    DacGammaEnable
    DacPaletteSet
}
```

TABLE X

```
DRAWENGOBJ
{
/* The DRAWENGOBJ structure has all the
   routines and data needed by the
   outside world to communicate with the
   DRAWENG DLL. */
    OBJHDR
    MaxScans
    PrivateDitherSize
    PDevice
    PDeviceSize
    Curves
    Lines
    Polygonals
    Text
    Clip
    Raster
    Caps
    ExtraCaps
    DrawengMiniFuncs
}
```

A substructure referenced by the DrawEngObj includes a number of basic drawing functions. This substructure is established within the Drawing engine object with a copy of the function pointers being kept in the code space of the GDI object to permit direct access to the functions within the linear execution of calls from the GDI object in response to API calls. The substructure is defined in Table XI.

TABLE XI

```
DRAWENGMINIFUNCS
{
    BeginAccess
    EndAccess
    CheckAccess
    SolidColorRop
    NotDst
    ColorPatternRop
    CacheColorPattern
    CacheMonoPattern
    MonoPatternExpandRop
    ScreenToScreenRop
    MemoryToScreenRop
    MemoryToScreenRopXlat
    MonoToScreenRop
    MonoToScreenXparRop
    GlyphBltXpar
    SolidLineRop
    SolidJointLineRop
    MultiSolidColorRop
    MultiMonoPatternRop
    MultiMonoPatternXparRop
    MultiColorPatternRop
    MultiNotDstRop
    MultiDitherColorRop
    SrcRopSrcKey
    SrcRopDstKey
    CreatePrivateDither
    PrivateDitherRop
    Polygon
}
```

As demonstrated by these object definitions, each of the hardware interface modules 76–88 initialize to establish a corresponding hardware interface object that includes a standardized portion permitting easy management of the objects and a hardware specific extension that provides a fixed set of object specific entry points. These object specific entries are filled in with pointer references by the initialization routine of the encapsulated hardware interface module. The pointer references are to functions within the encapsulated module that provide the logically referenced function. Where specific implementation of the logical function differs based on the current color depth, screen resolution, or other controller related characteristics, the encapsulated modules are preferably implemented with corresponding specific entry points. A proper subset of entry points are identified by the pointer references initialized into the object entry points, thereby implicitly establishing characteristic appropriate operation during the ongoing operation of the device driver 50 without repeated run time tests of the current characteristic state of the controller 19.

Consequently, the individual objects can be comprehensively managed based on the common OBJHDR aspects of the object structures while, at the same time, used to establish well defined entry point interfaces to each particular type of hardware interface object independent of underlying functional and implementation details, particularly including differing implementations of functions based on characteristics such as the current color depth and screen resolution.

In the preferred embodiment of the present invention, where a board.dmm file, identified from the board identifier, does not explicitly specify the existence of a clock, DAC or hardware cursor as being present on the video display controller 19, corresponding default modules statically linked with the board driver 74 as default modules are utilized. Thus, after the set of hardware interface modules have been identified, loaded and initialized, null pointers in the board object are detected by the board driver 74. If, for example, a hardware cursor object does not then exist, the board driver 74 creates the object and initializes the hardware-dependent entry points to corresponding default routines within the board driver 74. The functionality of a hardware cursor may thereby be supported through software emulation or, more typically, as an intrinsic component of another of the hardware interface objects. In either event, the default object is linked to the board object and thereafter provides the same intrinsic functionality as a dynamically loaded and linked hardware cursor object.

C. Upper Level Initialization Completion:

Once the hardware interface objects have been initialized, the initialization routine of the board driver 74 returns to the shell module 72. The shell module 72 then proceeds to create 109 the GRX API object 71. The GRX object serves as an internal universal or virtualizing interface to the operating system interface objects 64, 66, 68. The GRX object 71 presents a relatively simple interface as set forth in Table XII.

TABLE XII

```
GRXAPIOBJ
{
  OBJHDR
  GrxApiFastCopy
  GrxApiColorMatch
}
```

The GrxApiFastCopy call entry point provides a common access point usable by all operating system API level modules, particularly including the shell module, to manipulate bitmaps located in on-screen and off-screen video memory. Establishment of a common access point simplifies video memory management. The GrxApiColor-Match call entry point also provides a common access point usable by all of the operating system API level modules to perform a logical to physical color translation at the current color depth of the screen 32.

The initialization entry point within the OBJHDR of the GRX object 71 is called by the shell module 72 to initiate 110 the establishment of the operating system interface objects 64, 66, 68. In the preferred embodiment of the present invention, the GDI and DD objects 64, 66 are statically identified within the GRX object initialization routine. Alternately, or in addition, operating system interface objects may be identified by the shell module 72 by reference to an interface.dat configuration file. The identified operating system interface modules, if not statically linked with the shell module 72, are sequentially loaded 112 into the memory 16.

As each operating system module is loaded 112, a module initialization routine 114 is called. The initialization of each operating system interface module results in the creation of a corresponding operating system interface object. As with the hardware interface objects, the operating system interface objects each preferably contains an object header substructure (OBJHDR) that establishes a common basis for manipulation of the operating system interface objects. The use of the object header also provides support for a call to signal a mode change by the device driver 50. In turn, the operating system objects support, as needed, private data spaces for each instantiation of the objects.

The GDI object 120 is created with the definition given in Table XIII.

TABLE XIII

```
GDIOBJ
{
  OBJHDR
  GdiColorMatch
  PDevice
  SystemPDevice
  GdiInfo
  SystemGdiInfo
  VddMagicNumber
  VddEntryPoint
  Palette
  DibengObj
  DrawengObj
}
```

The GDI object 120 includes or provides a linked reference to a substructure interface (DibengObj) of the standard Dib Engine. The substructure is defined in Table XIV.

TABLE XIV

```
DIBENGOBJ
{
/* The DisplayDriverFuncs will hold the set of functions
   that should be dispatched to for a bitmap associated
   with the display device or for a memory bitmap,
   depending on whether the identified bitmap is a device
   or in-memory bitmap. The appropriate function pointers
   are determined at init time so that they can be copied
   into the BMP headers easily as the bitmaps are created.
*/
  OBJHDR
  DisplayDriverFuncs
  DisplayDriverExtFuncs
}
```

The further standard substructures of the DibengObj are defined in Tables XV and XVI.

TABLE XV

```
DISPLAYDRIVERFUNCS
{
/* this structure of function pointers is
   also added to or copied into the
   bitmap headers on device drive
   initialization of the bitmap */
  Bitblt
  ColorInfo
  Control
  Disable
  Enable
  EnumDFonts
  EnumObj
  Output
  Pixel
  RealizeObject
  StrBlt
  ScanLR
  DeviceMode
  ExtTextOut
  GetCharWidth
  DeviceBitmap
  FastBorder
  SetAttribute
  DibBlt
  CreateDiBitmap
  DibToDevice
  SetPalette
  GetPalette
  SetPaletteTranslate
  GetPaletteTranslate
  UpdateColors
  StretchBlt
  StretchDibits
```

TABLE XV-continued

```
    SelectBitmap
    BitmapBits
    Inquire
    Polyline
    Polygon
    Polygon
    Polyscan
    Scanline
}
```

TABLE XVI

```
DISPLAYDRIVEREXTFUNCS
{
    SetCursorExt
    MoveCursorExt
    CheckCursorExt
    BeginAccess
    EndAccess
    CreateDibDPevice
    RealizeObjectExt
    DibBltExt
    EnumObjExt
    ExtTextOutExt
    UpdateColorsExt
    SetPaletteExt
    GetPaletteExt
    SetPaletteTranslateExt
    GetPaletteTranslateExt
}
```

Tables XV and XVI illustrate the objects defining the Direct Draw object 124.

TABLE XV

```
DDRAWOBJ
{
    /* Remember that this is probably going to be
       most heavily used in 32bit land
       although it must compile for both. */
    OBJHDR
    ObjInstData;
}
```

TABLE XVI

```
DDRAWINSTDATA
{
    /* Here is the DDRAW instance data structure -- It is
       shared between 16 and 32 bit land. */
    Reset
    ThunkReturn
    16PDevice16
    32PDevice16
    16ShellObj16
    32ShellObj16
    32ShellObj32
    16BoardObj16
    32BoardObj16
    32DrawengObj32
    HALCallbacks
    HALInfo
    DDCallbacks
    DDSurfaceCallbacks
    DDPaletteCallbacks
    VideoMemoryHeap[1]
    DDrawModeList
}
```

To support use in both 16 and 32 bit environments, an additional ObjInstData substructure is employed to provide both 16 and 32 bit pointers to the components of the device driver 50 in support of both 16 and 32 bit API calls.

Finally, as the initialization of each the operating system interface objects is completed, a link 116 is established between the GRX object 71 and the GDI and DD objects 120, 122. The GRX initialization routine then returns to the shell. Also, all of the operating system interface objects are then linked to the shell object. The initialization routine of the shell module 72 then returns.

Figure 4:
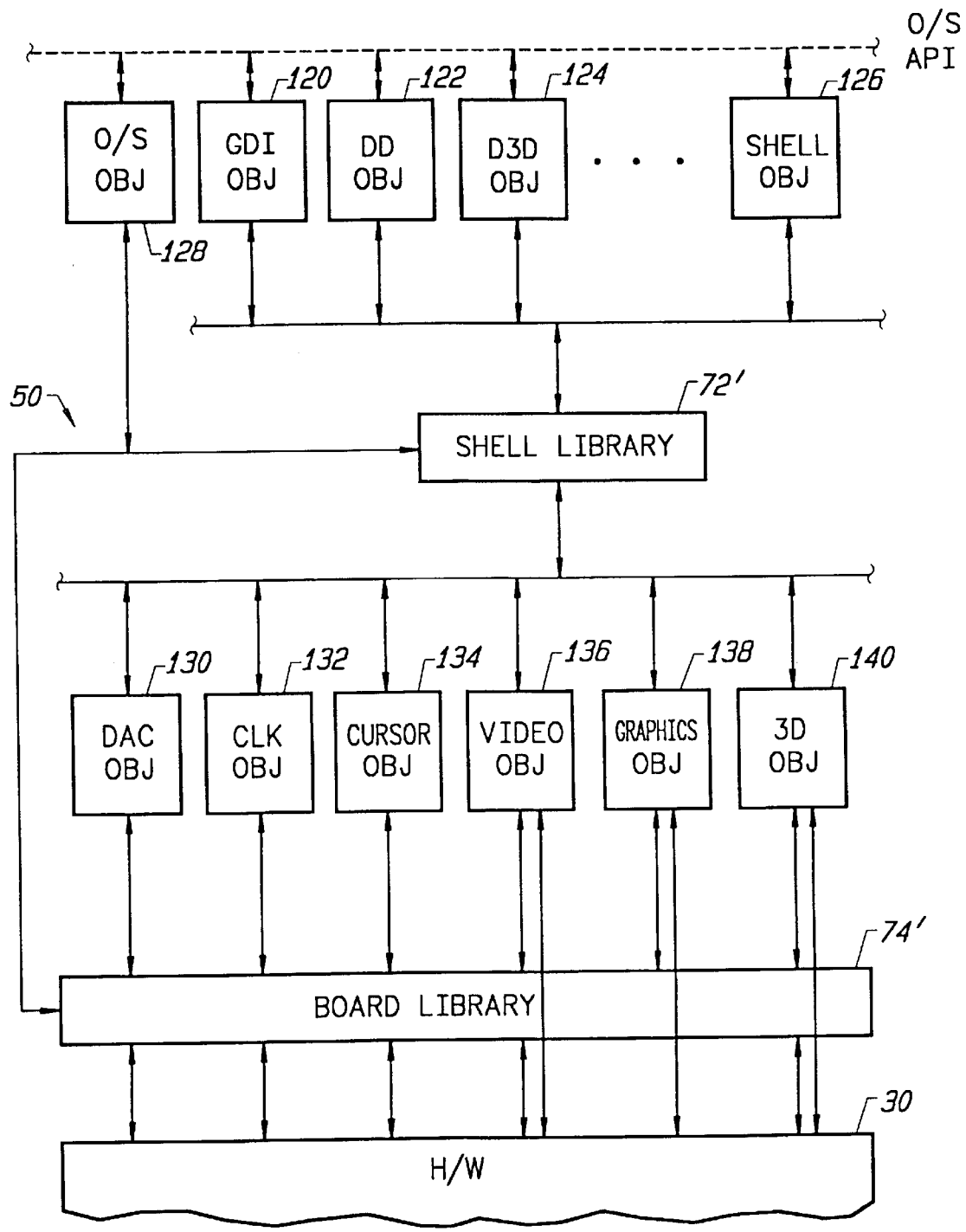
FIG. 4 provides a schematic block diagram of the architectural configuration of the present invention during a run time execution of the device driver of the present invention.

IV. Operational State Configuration:

FIG. 4 illustrates the logical configuration of the device driver 50 during operation in a single context state and with each operating system and hardware interface object logically encapsulating a corresponding executable module. A logically unencapsulated portion of the shell 72 remains resident as a generalized shell library 72'. Similarly, a logically unencapsulated portion of the board driver 74 remains resident as a board library 74'. Both libraries 72', 74' function as common resources supporting the internal function of the device driver 50. Thus, from a driver software perspective, the initialized device driver 50 is defined by the operating system interface objects that cohesively establish the operating system API presented by the device driver 50 and the hardware interface objects that establish the hardware specific interface between the device driver 50 and the hardware interface registers 30.

A. Upper Level Relationships:

The operating system interface objects, including a GDI object 120, Direct Draw object 122, Direct 3D object 124 and Shell object 126, represent a set of objects that are logically partitioned from one another by the definition of the partial APIs that they present to the operating system layer 54. The revision of existing API call support and the addition of new API calls to any particular operating system interface object has, by design, essentially no impact on the implementation or operation of other operating system interface objects. Further, support for a new partial API, either as newly defined by the operating system layer 54 or to support calls originated directly from an application 60, can be readily provided through definition of a corresponding operating system interface object and encapsulated operating system interface module. However, if a new or revised API call involves or requires a significantly different function than any of the other API calls supported by the existing operating system interface objects, additional library routines may need to be added to the shell library 72'.

The shell library 72' is logically partitioned from operating system interface modules to provide a library of routines that serve to establish a set of common, or virtualized, support functions usable by the full set of operating system interface objects. Preferably, each of the operating system interface objects is functionally constrained to (1) support a well-defined API call set, (2) provide for parameter validation for each supported API call, (3) potentially manage a private data space for data objects that are desired to persist across context changes in the operation of the device driver 50, (4) issue a sequence of one or more virtualized calls to the shell library 72' to functionally implement each of the API calls supported by the object and, finally, (5) format and return data to the operating system layer 54 in a manner appropriate for each API call supported by the object.

As recognized by the present invention, variants of many calls to the device driver 50 are directed to different specific APIs. These variants differ in specific aspects, such as the particular form and sequence of the operand data provided with the calls. As such, the validation of the particular operand data is specific to each API call. Each object therefore preferably performs API call specific operand validation and, potentially, conversion of the operand data to a format that is unified as against other functionally similar API calls supported by this or other operating system interface objects. Thus, sets of one or more API calls are virtualized internally to the device driver 50.

Each operating system interface object manages a context specific data space as needed to preserve data objects related to, derived from, or provided as operands of the API calls supported by the operating system interface object. For example, the GDI object 120 may maintain a data object defining the resolution dependant bit-mapped pattern or colors associated with an instance of the display pointer 38 in a given context. Consequently, upon resumption of an existing context, the data object can be used to efficiently re-realize the instance of the display pointer 38 in this context. Of particular note is that the re-realization is supported entirely without any required participation or even notice to any application program 60 or the operating system layer 54. The data object, in this example, is derived from an original data object provided as an operand of an API call that initially set the pattern or color of the display pointer 38. As a new context, involving for example a new color depth, is created, a new data object is derived by a color depth translation from the data object of the prior context. On a context switch to a pre-existing context, the pre-existing instance of the data object is reused with the result that no information is lost in the re-realization of an instance of the display pointer 38.

Similarly, an instance of the GDI object 120 preferably maintains not only a color palette, in a palettized color context, but also the forward and inverse palette translate tables as part of the PDevice structure specific to the palettized context. In the Windows '95™ operating system, the operating system layer 54 supports a single pointer to a physical device (PDevice) structure that is used to maintain certain information that is passed to display type device drivers on at least selected calls from the operating system layer 54. The intent of the PDevice structure is to provide a augmentable data structure that can be used by the device driver 50 to generally store hardware specific configuration data. The present invention not only utilizes the PDevice structure to store color translation tables specific to a palettized context, but generally replicates a new PDevice structure for each context and augments the structure consistent with the color depth of the corresponding context. The preferred structure of the PDevice structure is provided in Table XVII

TABLE XVII

PDevice
{
    Dibeng
    DmmFlags
    DibengObj
    xCoord
    yCoord
    BitmapInfoHeader
    /* additional fields specific to palettized contexts */
    Colors[0x100]
    PaletteTranslateTable[0x100]
    InversePaletteTranslateTable[0x100]
}

Maintenance of color palette translate tables effectively as a context specific persistent data object allows rapid restoration of the color palette and translate tables on a context switch to the palettized context. Maintaining the color palette translate tables as part of the PDevice structure also supports continuing palette based drawing operations particularly during non-palettized contexts and, potentially, during other palettized contexts that use an independent PDevice structure with independent color palette and translate table definitions. In either event, ongoing drawing operations driven from applications executing logically against a palettized context can be correctly translated to the color depth or color palette of the current active context by translating or resolving the drawing commands against the color palette data and translate table of the corresponding context. That is, the drawing commands of applications 60 executing logically against a non-currently active context are effectively re-realized as needed by reference to the data objects of a non-current context to perform the drawing commands at the color depth of the current context. The data objects of a non-current context can be located by searching the data structures, specifically the shell objects that are used to define each context.

In the preferred embodiment of the present invention, the operating system interface objects represent a rather thin layer. API calls are preferably virtualized at a high level into substantially linear call sequences to the shell library 72' and hardware objects 130–140 as appropriate to define threads of execution for each of the specific API calls supported by the interface objects. In general, maximizing the use of common calls to the routines in the shell library 72' is desired. Conversely, limiting the function of the operating system interface objects to substantially data validation, basic data transformations and specification of the linear execution thread for each supported API call is desired.

In the Windows '95™ implementation, the operating system layer 54 issues fairly atomic API calls to the device driver 50. Consequently, almost all of the operating system interface objects will make only a few calls the shell library 72' and hardware interface objects to functionally implement the execution thread needed to perform an API call. Where expedient for performance or where usage is substantially limited to a particular API call, some executive functions can be performed by the operating system interface object. In particular, an initial clipping and translation of coordinates may be performed by an operating system interface object in concert with operand validation in -response to an API call to draw an object. More substantial routines or routines more likely to be required by multiple API calls, such as the routines used to establish storage of a new persistent data object, to perform a color depth translation to derive the content of the new data object from another, and to then realize a drawing operation to the screen 32 are preferably implemented as appropriate in the shell library 72' and hardware interface objects.

Thus, for example, a first API call is made by the operating system 54 to a corresponding operating system interface object to request the creation of a desired new data object and to ultimately receive back a pointer to the object. The virtualized linear thread of calls begins with a call to the shell library 72' that in turn requests allocation, locks in memory and returns a pointer to the resulting object. The shell library 72', in performing these requests, sequentially calls on the operating system interface object 128 as needed to relay required operating system API calls to the operating system layer 54. This linearization of the individual functions supported by the shell library 72' is made possible by the preemptive operand validation and virtualization performed by the operating system interface objects. The operand data is established before the shell library 72' or any of the hardware interface objects are called in a form and format proper for each processing step that follows from a particular API call. Consequently, most if not essentially all conditional branches for handling exceptional conditions or to determine whether data is available or in an acceptable format for processing are obviated below the level of the operating system interface objects; without ongoing conditional branching to check for the existence, form and format of operand data, the implementation of the virtualized API calls becomes substantially linearized. Furthermore, the initialization of the hardware interface objects with function pointers to current color depth and resolution appropriate functions eliminates ongoing conditional branching to check and adjust for the current operating state of the display 32.

A next API call to an operating system object may then direct the conversion of an identified data object in the newly created data object. Subsequent API calls through an operating system interface object can then specify performance of specific drawing operations using the prior created and converted API call identified data object. Each API drawing call is executed by the receiving operating system interface object by again issuing a substantially linear sequence of one or more calls to the shell library 72' and hardware interface objects as appropriate to realize the particular drawing operation.

Thus, each of the operating system interface objects are defined to maximize the virtualization of calls by performing operand verification and format conversion while including a minimum of duplicate code. Use of the shell library 72' is therefore maximized, yet without an execution performance penalty due to any repeated revalidation, conversion or reformatting of the original operand data. Furthermore, the operating system interface objects are provided with direct function call access to the hardware interface objects through immediately available function pointers and without the need to continuously re-evaluate and adjust for the operating characteristics of the controller 19.

The shell library 72' may also provide for the effective expansion and implementation of common virtualized calls received from the operating system interface objects. Such calls to the shell library 72' are preferably expanded into typically short, substantially linear call sequences directed to the hardware interface objects to invoke, in turn, hardware specific functions. The particular set or subset of the hardware interface objects called by the shell library 72' is highly dependent on the particular call received from an operating system interface object. However, each of the calls made by the shell library 72' retain an effective virtual relationship with the set of hardware interface objects as a consequence of the virtualized definition of the hardware interface object data structures. That is, the structure definition of the hardware interface objects is essentially fixed for each object type independent of the implementation of the specific hardware interface module encapsulated by the object. Consequently, calls from the operating system interface objects as well as the shell library 72' to the hardware interface objects are abstracted from the actual implementation of the hardware interface modules. By use of the short substantially linear call sequences used to implement the API calls, the speed of execution of the virtualized API calls is maximized.

B. Lower Level Configuration Relationships:

The hardware interface objects are similar to the operating system interface objects in that they are preferably realized as a thin layer that defines the hardware specific operations needed to interface with the interface registers 30 of the controller 19. The hardware interface objects are preferably functionally constrained to (1) support a well-defined set of operations specific to a particular type of hardware sub-element, (2) provide for at least the logical programming of relevant hardware interface registers to implement the function of each supported operation, (3) potentially manage a private data space for data objects that are desired to persist across context changes in the operation of the device driver 50, and, finally, (4) return certain data read directly or indirectly from the interface registers 30.

The operations supported by a particular type of hardware interface object are defined as part of the object structure. In general, a call to a hardware interface object results in the generation of a reference to one or more registers of the interface registers 30 and a string of data values to be programmed into the referenced registers. Preferably, the actual programming of registers is performed in response to a call to the board library 74'. As with the shell library 72', the board library 74' concentrates the generalized or common routines used by the hardware interface objects. Thus, the duplication of code is generally reduced and the detailed register interface routines, including the routines for locating, defining and managing the display buffer 20 within the address space of the memory 16, are largely located in a well defined location essentially isolated from all other aspects of the device driver 50. Preferably, the one significant exception to this occurs in relation to the graphics hardware interface object 138. For performance purposes, this object preferably operates directly against the register interface 30 and the display buffer 20. Accordingly, the board library 74' preferably provides a routine that returns the current location and definition of the display buffer 20. It is anticipated that the video and 3D hardware interface objects 136, 140 will also benefit by having direct access to hardware interfaces of the corresponding sub-elements of the controller 19.

Consequently, an efficient layered virtualized relationship between the operating system interface objects through to the hardware interface objects is established by the present invention. This virtualized relationship is readily demonstrated by tracing the execution flow of two different API calls to the device driver 50.

V. Operational State Context and Mode Switching:

In the preferred embodiments of the present invention, the video display controller 19 is operable at many different horizontal and vertical, or spatial, resolutions and at many different color depths. Conventional computer systems 10 often execute a multiplicity of applications 60 that operate optimally against different spatial resolutions and color depths.

Indeed, the spatial and color depth requirements and operational limitations of applications 60 that attempt to co-execute on the computer system 10 can limit co-execution to spatial resolutions and color depths that, if not mutually exclusive, are often non-optimal for the continued execution of the applications 60.

The architecture of the device driver 50, in accordance with the present invention, provides for the performance of mode switches, alone and in combination with context switches in the operating state of the device driver 50. Both mode switches and context switches are performed and particularly are managed essentially independent of the context state of the applications 60 and of the operating system layer 54. Mode switches alone may be performed where data specific to a particular aspect of an existing mode must persist across the mode switch. A context switch is performed by the device driver 50 in combination with a mode switch to provide for persistent storage of mode data in an independent context. Thus, device driver context switches can be used to support stateful controller mode changes by storage of state and mode specific data in persistent data objects associated with specific contexts. Management of the contexts and performance of context switches by the device driver 50 allows context switching without alteration of an application program 60 and with only a few specific modifications being made to the operating system kernel 56.

A. Constant Context Mode Switch:

To support mode switches, the operating system kernel 56 is modified by installation of a patch 62 to the kernel 56 that will issue an API call directing the device driver 50 to switch the video display controller 19 to a spatial resolution preselected for the application 60 whose window has the current pointer focus. More advanced operating systems 54 may intrinsically provide for the generation of an event that can be used without the need to install an operating system patch. Preferably, the patched in mode set API call is hooked to the shell object and provides the desired new spatial resolution of the physical display 32. The API call will also specify a color depth in combination with the desired spatial resolution. If both the desired color depth and spatial resolution are the same as the current color depth and spatial resolution, the API call simply returns. If only the spatial resolution differs, then only a mode switch need be performed. The controller mode set change needed to perform the mode switch is performed in the then current context of the device driver 50.

In accordance with the preferred embodiment of the present invention, a mode set change within a single context is performed largely under the control of the shell object 126 and shell library 72'. The API call to the shell object 126 specifies that a mode set is to be performed. The shell object 126 calls through the O/S object 128 to the operating system layer 54 to obtain the desired color depth and spatial resolution. The shell object 126 first validates the returned operands specifying the desired spatial resolution. The set mode routine of the shell library 72' is then called by the shell object 126 to sequentially call each of the operating system and hardware interface objects, first with a "mode is about to change" operand, then with a "mode change" operand, and finally with a "mode has changed" operand.

The first call with the "mode is about to change" operand initiates the sequence of events within the device driver 50 necessary to quiesce the state of the driver 50 with respect to the controller 19. In particular, mode set routine of the shell library 72' operates to identify each of the operating system and hardware interface objects within the current context that need to participate in the mode set. These interface objects are identified as those having a valid or non-null pointer to an object specific RegClassHandler structure. Mode set calls are then placed in sequence to each of the participating objects. In response, each object in sequence executes to save current state data to system data structures, such as the current PDevice and GDI_Infotable structures, or to the private data space of the object itself as appropriate to establish a well defined execution state within the current context. When the last participating object has returned, operation of the device driver 50 has been essentially quiesced. The shell library 72' then returns to the shell object 126.

The second mode set call, specifying "mode change," is then issued by the shell object 126 to the shell library 72'. The board library 74', upon being called by the shell library 72' with the "mode change" operand, constructs a "SectionName" that corresponds to the desired combination of spatial resolution and color depth. O/S API calls are then made through the operating system interface object 128 to scan a modes.dmm configuration file, preferably having a structure syntax generally the same as that of the system.ini file, to locate a section identified by the given "SectionName". In a Windows '95™ implementation, the SectionHeader defining a spatial resolution of 1024×768 with an 8 bit per pixel color depth is specified as "[1024,768,8]."

The text following the given SectionHeader is read in and parsed by the shell library 72'. This text represents a structured specification of the particular mode set instructions that must be performed against each participating sub-element of the controller 19 to set a new controller mode of operation. The mode set instructions are, in the preferred embodiment, line oriented statements structured in comma delimited terms as REGISTERCLASS, COMMAND, and arguments. In the preferred embodiment, the "class name" field of the RegClassHandler structure will be correlated to the REGISTERCLASS term of an instruction to ultimately determine which sub-element of the controller 19 that is to be programmed in response to a particular instruction.

There are presently four directly executed commands: run (RUN), read/mask/write (RMW), delay (DLY) and Int10 (I10). A fifth instruction supported in the preferred embodiment of the present invention is an include directive pseudo instruction that directs the parsing routine of the shell library 72' to logically include, and thereby parse, instructions found under an include directive specified SectionName in the modes.dmm file. The run command has the following instruction format:

REGISTERCLASS, RUN, REGISTERNAME, value1, value2, value3, . . .

The REGISTERNAME term provides a logical name that can be traced, using the REGISTERCLASS association, through a RegClassHandler structure to a RegClassMap structure. The logical REGISTERNAME name is defined in the RegClassMap against a logical port address that can ultimately be resolved to a specific register within the register interface 30. In execution of the instruction, the parsing routine of the shell library 72' writes the port address of REGISTERNAME with the first value, "value1." The next sequential port address identified in the RegClassMap is then written with the second value, value2. Thus, logically sequential port addresses are written with successive values until all of the value provided with the particular run command have been written.

The read/mask/write command has following instruction format:

REGISTERCLASS, RMW, REGISTERNAME, ANDMask, XORMask

In execution of this instruction, the parsing routine of the shell library 72' first reads in the value from the port address corresponding to REGISTERNAME, performs a binary AND of the value with ANDMask, and performs a binary XOR of the resultant with XORMask. The resultant is then written back to the REGISTERNAME port address.

The delay comad has following instruction format:

SHELL, OLY, DelayValue

The RegisterClass of this instruction is always "SHELL," since no hardware interface object is directly related to the execution of the instruction. In executing this instruction, the parsing routine of the shell library 72' implements either a software or hardware based wait for a period of time specified by DelayValue, preferably as a multiple of 50 microseconds. The delay instruction is useful where hardware programming setup times must be respected, but a register readable ready signal is not provided by the hardware. The parsing routine simply continues af ter expiration of the delay time period.

The Int10 comad has following instruction format:
SHELL,I10,EAX,EBX,ECX,EDX

Again, the RegisterClass of this instruction is always "SHELL," 0 since no hardware interface object is directly related to the execution of the instruction. The parsing routine of the shell library 72' implements this instruction by calling the O/S object 128 to perform a software interrupt 10 and provide the arguments of the instruction in the corresponding CPU registers at the time of the interrupt.

Finally, the include command has the following specific instruction format:
SHELL,INC, SectionName The include command instructs the parsing routine of the shell library 72' to effectively suspend parsing of the current section of the modes.dmm file and parse the section identified by "SectionName." Parsing of the suspended section resumes after the included section has been parsed by the shell library 72'.

In executing the instructions provided by the modes.dmm file, the shell library 72' utilizes the REGISTERCLASS term to associate a particular instruction with a corresponding hardware interface object. Since the instructions are directed to ultimately programming the operating mode of the controller 19, the operating system interface objects, in the preferred embodiment of the present invention, are not referenced by any REGISTERCLASS term of the instructions.

As an instruction is executed, Read_reg and Write_reg entries in the corresponding RegClassHandler structure are called by the parsing routine to perform the read/write operations required in the execution of the instruction. Since the RegClassHandler structure is object specific, the Read_reg and Write_reg functions are also specific to the particular object identified by the REGISTERNAME term.

In the preferred embodiment of the present invention, each object's Write_reg function provides for the effective translation of a register/argument pair, as obtained in the execution of an instruction, to a hardware specific representation of the registers that are to be actually written. The register/argument pairs are written effectively by the execution of the instructions to a flat, sequential logical register model. The Write_reg functions convert the pairs to a sub-element hardware specific model. For example, in the specific circumstance of the DAC interface object 130, the conversion is to a multiplexed register model that requires a base physical register to be programmed with a logical register index value and a next sequential base register that is programmed with the value to be stored in the indexed logical register. Thus, while sequential registers are referenced in the calls to the Write_reg function of the DAC interface object 130, a single pairing of physical base registers are written by the function.

Each object's Read_reg function performs a similar conversion. The referenced logical register is converted to a reference to a corresponding physical base register. In the case of the DAC interface object 130, the conversion includes programming the base physical register with the index defining the logical register so that the correct value may be read out.

Other interface objects may provide for the conversion of the flat sequential register model of the instructions to a serial, or bit sequential, model as appropriate to program another sub-element of the controller 19. Thus, the sequential register/argument pairs are converted into a logical register index value followed by a bit serial sequence of program values appropriate to program a specific sub-element of the controller 19.

As an example, a Diamond Stealth 64 Video DRAM video controller, utilizing an S3 Vision868 graphics accelerator chip, can be selectively programmed to enable graphics mode:

```
[GraphicsEnable]
CRT, RUN, LAW_POSITION_1, 0xF0, 0x00
CRT, RMW, LAW_CONTROL, 0xEC, 0x13
CRT, RMW, EXT_MEM_CONTROL_1, 0xE4, 0x18
``` disable graphics mode:

```
[GraphicsDisable]
CRT, RMW, LAW_CONTROL, 0xEC, 0x00
CRT, RMW, EXT_MEM_CONTROL_1, 0xE4, 0x00
``` and swtich to a 1024×768×8 mode:

```
[1024,768,8]
CRT,RUN,LOGICAL_LINE_LENGTH, 0x80
CRT,RUN,EXT_MODE,0x00
CRT,RUN,EXT_SYSTEM_CONTROL_2,0x00
CRT,RUN,EXT_SYSTEM_CONTROL_1,0x00
CRT,RUN,MEM_CONFIG,0x89
SEQ,RMW,UNLOCK_EXTENSIONS,0x00,0x06
SEQ,RUN,CLOCKING_MODE,0x01,0x0f,0x00,0x0e,0x00
GRX,RUN,SET_RESET_DATA,0x00,0x00,0x00,
    0x00,0x00,0x00,0x05,0x0f,0xff
ATR,RUN,PALETTE_0,0x00,0x01,0x02,0x03,0x04,0x05,
    0x14,0x07,0x38,0x39,0x3a,0x3b,0x3c,0x3d,
    0x3e,0x3f,0x01,0x00,0x0f,0x00,0x00
SEQ,RMW,UNLOCK_EXTENSIONS,0x00,0x00
CRT,RMW,EXT_RAMDAC_CONTROL,0xfe,0x01
DIR,RUN,DACRS10_PORT,0x00
CRT,RMW,EXT_RAMDAC_CONTROL,0xfe,0x00
```

In the preferred embodiment, the Write_reg and Read_reg functions of the hardware interface objects utilize a number of functions in the board library 74' to actually perform hardware read and write operations against the register interface 30. This additional level of indirection allows for the different hardware sub-elements of the controller 19 to exist at different physical addresses depending on the particular model of the controller 19. Thus, while a particular hardware interface object fully represents the particular programming of a sub-element of the controller 19, the board library 74' implicitly locates the sub-element within the physical address space of the computer system 10. Consequently, the base physical register identified by the DAC interface object through a Write_reg function call is logically relative to the DAC sub-element itself. The board library 74' supplies a physical addressing offset for the DAC base physical registers to locate the registers within the physical system address space of the register interface 30.

In order to establish physical addressing offsets, the board library 74' provides a number of read and write routines that are, in turn, specific to the major types of sub-elements of the controller. For example, the clock interface object, though controlling a specific and well defined sub-element of the controller 19, typically references a programmable clock generator located within or accessible through the registers associated with the DAC sub-element. Thus, the physical addressing offset provided by the board library 74' for both the DAC and Clock interface objects will be the same.

The board library 74' preferably supports a BoardRead_reg and BoardWrite_reg functions for hardware interface objects that address a flat sequential physical register set. BoardRead_DAC, BoardWrite_DAC and BoardWrite_

DAC__Array functions are provided by the board library 74' to support reading and writing of multiplexed registers and to write the color palette array located within the physical register address space of the DAC sub-element as established by the controller 19.

Finally, BoardWrite__SerialDevice__start, and BoardWrite__SerialDevice__end functions are provided to support serial write operations to serially programmed sub-elements of the controller 19.

Once the instructions scanned from the modes.dmm file have been executed, the operating mode of the controller 19 has been changed to correspond to the desired spatial resolution and color depth. The shell library 72' then calls each of the mode set functions of the participating set of interface objects with "change mode" as the operand to the call. The interface objects utilize this call to execute any sub-element specific routines needed to establish the new operating mode of the controller 19. Any required programming of registers in the register interface 30 or direct manipulation of the display buffer 20 can be performed at this time. When the last of the interface objects returns from this mode set call, the shell library 72' returns to the shell object 126.

The third and final call, with a "mode has changed" operand, is then made by the shell library 72' to each of the interface objects participating in the mode set. Preferably, the participating hardware interface objects are called prior to the operating system interface objects. As each interface object is called, the object executes any hardware specific operation necessary to support the operation of corresponding sub-element of the controller 19 in the new operating mode of the controller 19. In general, the hardware interface objects simply return in response to this call. An exception exists where a particular object has implementation dependencies based on spatial resolution, color depth or other device characteristics. Where a module encapsulated by a hardware interface object, such as the Graphics object 138, presents multiple routines supporting the same logical function distinguished by color depth, for example, function pointers in the call entry points of the object structure are updated to point to the routines appropriate for the new color depth.

The operating system interface objects preferably utilize this "change mode" call to re-realize data objects existent in the current context so as to correspond to the display resolution, color depth or other device characteristics of the new operating mode of the controller 19. Specifically, operating system interface objects such as the GDI object may be managing bit map data objects that represent features visible on the display 32. Thus, a particular operating system object may preferably first copy any changed hardware interface object function pointers frequently used by the operating system interface object into the local code space of the operating system interface object in support of expedient call dispatch. A linear interpolation of the bit maps is then preferably performed to adjust the actual bit map resolution data object to match the new spatial resolution of the display 32.

The operating system interface objects finally respond to the "mode has changed" mode set call by directing, as needed, corresponding update operations to effectively refresh the display 32. Such updates are specifically performed for any operating system interface object that has re-realized a data object that is visible on the display 32 in the new operating mode of the controller 19. Once the screen refresh has completed, the shell library mode set routine returns to the shell object which, in turn, returns from the mode set API call. The process of changing the mode within a current context is thus completed.

B. Combined Context and Mode Switch:

A context switch is performed in combination with a mode switch to support, in a preferred embodiment, the mode set of the controller 19 to a new color depth. API calls on behalf of applications 60 that execute in expectation of a particular color depth that differs from that of the current operating mode of the controller 19 must be conformed to the current color depth. Particularly where such API calls are made to the device driver 50 in reliance on the existence of a persistent palette or color map, support of contexts is desirable if not necessary. An alternative may be supported by the operating system. A callable entry point into the operating system kernel 56 may provide for color depth translation of all resident bit maps at or above the O/S API call interface to a target color depth. However, issues may exist as to the efficiency and reversibility of such translations and the potential incompatibility of applications and device drivers that interoperate with the operating system layer 54 based on persistent assumptions about the constant form and format of bit maps that are actually variable. Consequently, context switching that is isolated to within the device driver itself will likely be more robust and portable among different operating system implementations.

Palettes and other persistent data are maintained by each context and are therefore available for reference even when such contexts are not currently active. A context is created by default during the initialization of the device driver 50. Additional contexts are created as needed in response to API calls made to the device driver 50 for mode changes to new color depths.

Figure 5A:
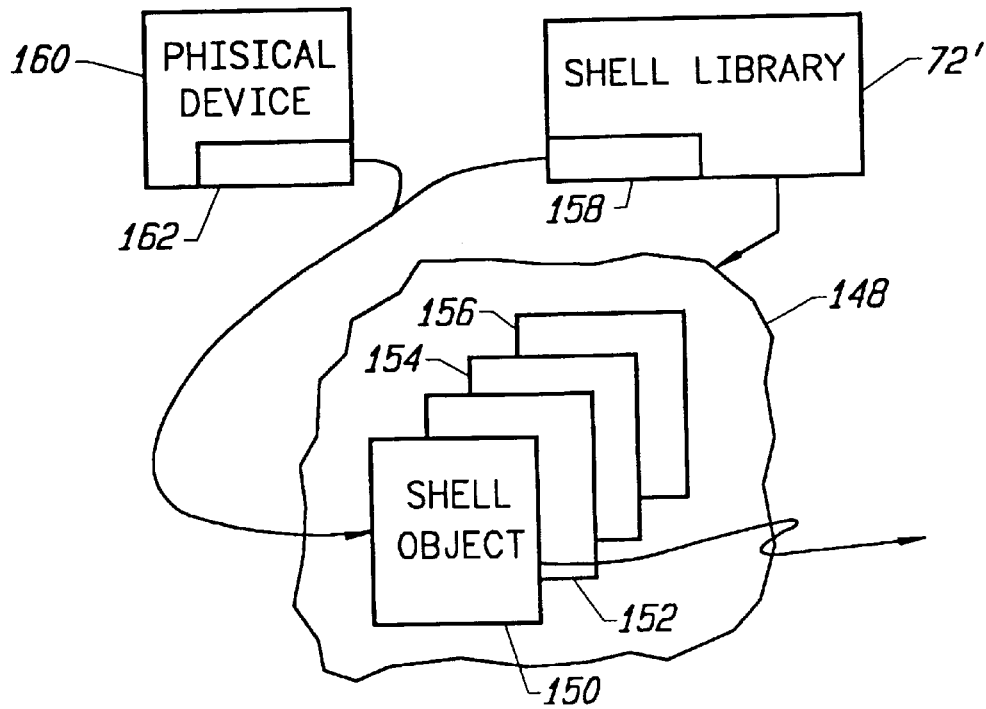
FIG. 5a provides a general illustration of the relationship between plural shell objects defining device driver context, the Shell Library, and the physical device structure of the operating system consistent with the preferred embodiment of the present invention.

Referring now to FIG. 5a, the shell library 72' manages a memory pool 148 including at least initially a single shell object 150 and potentially the additional shell objects 152, 154, 156. Each of the shell objects 150, 152, 154, 156 represents an independent context within the device driver 50. One or more of the shell objects 150, 152, 154, 156 may exist at any time within the pool 148 as appropriate to represent a color depth of one or more then currently executing applications 60. Contexts, including the context represented by the shell object 150, may be later closed if no then executing application 60 references the color depth supported by the context. The shell library 72', in addition to managing the pool of shell objects 148, also maintains a current context pointer 158. This pointer 158 is used to identify the particular shell object 150, 152, 154, 156 that corresponds or logically defines the current operating mode of the controller 19.

Figure 5B:
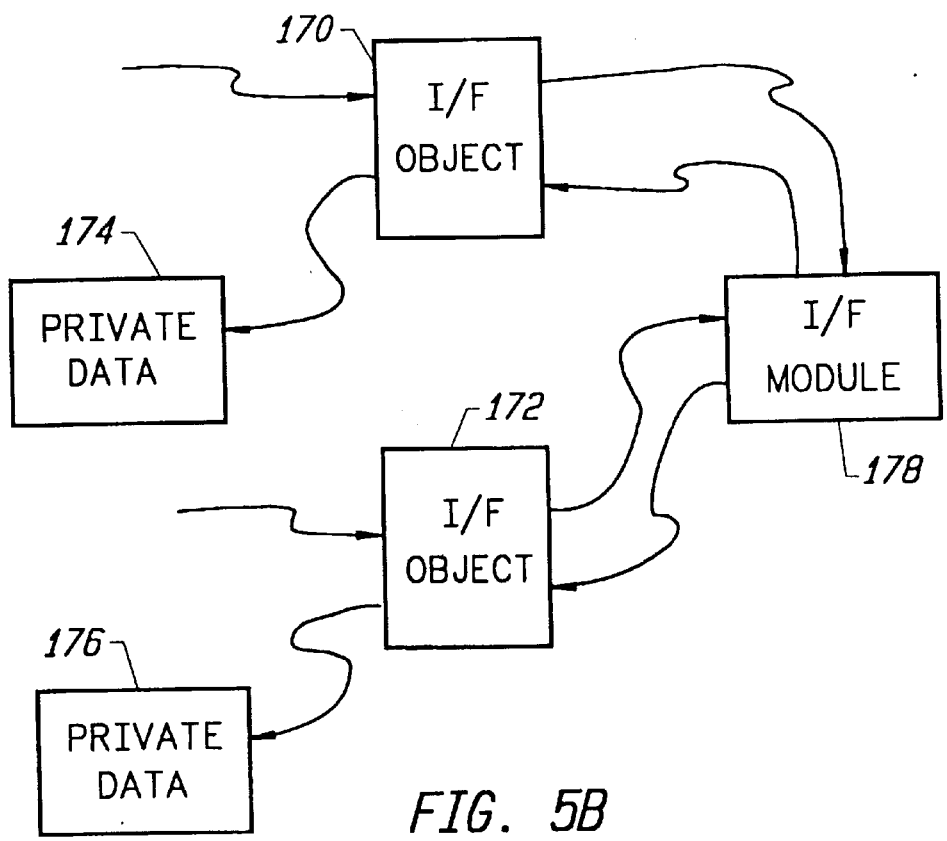
FIG. 5b provides a generalized illustration of the relationship between plural instantiations of a hardware interface object consistent with a preferred embodiment of the present invention.

As generally shown in FIG. 5b, the use of shell objects to define contexts in the operation of the device driver 50 permits the instantiation of distinct interface objects 170, 172 in respective contexts within the device driver 50. With each instantiation of an interface object 170, 172, a private data space 174, 176 is allocated and associated with a respective interface object 170, 172. However, all instantiations of a particular interface object 170, 172 encapsulate, in common, a shared interface module 178. In the execution of the interface module 178, reference to the private data spaces 174, 176 is enabled through independent pointers established in the respective interface objects 170, 172. Consequently, the interface module 178 is implicitly connected in a specific context to the correct object; the module 178 is not required to explicitly manage aspects of the existence of multiple contexts. Rather, the function of context management and manipulation is concentrated in and performed by the routines of the shell library 72'.

Figure 6A:
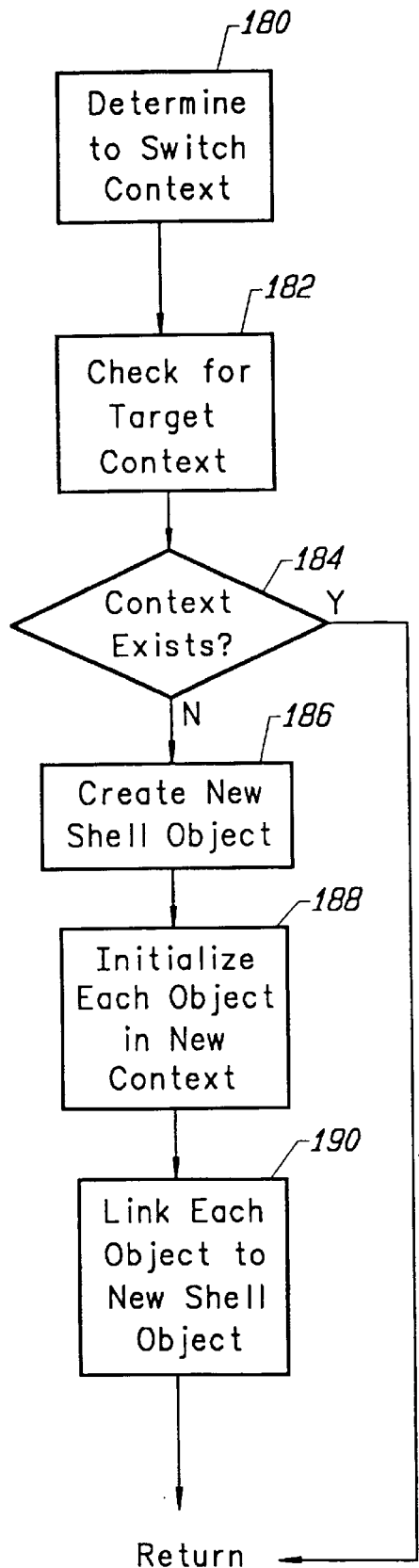
FIG. 6a provides a flow diagram describing the performance of steps in preparing for a context switch in accordance with the preferred embodiment of the present invention.
Figure 6B:
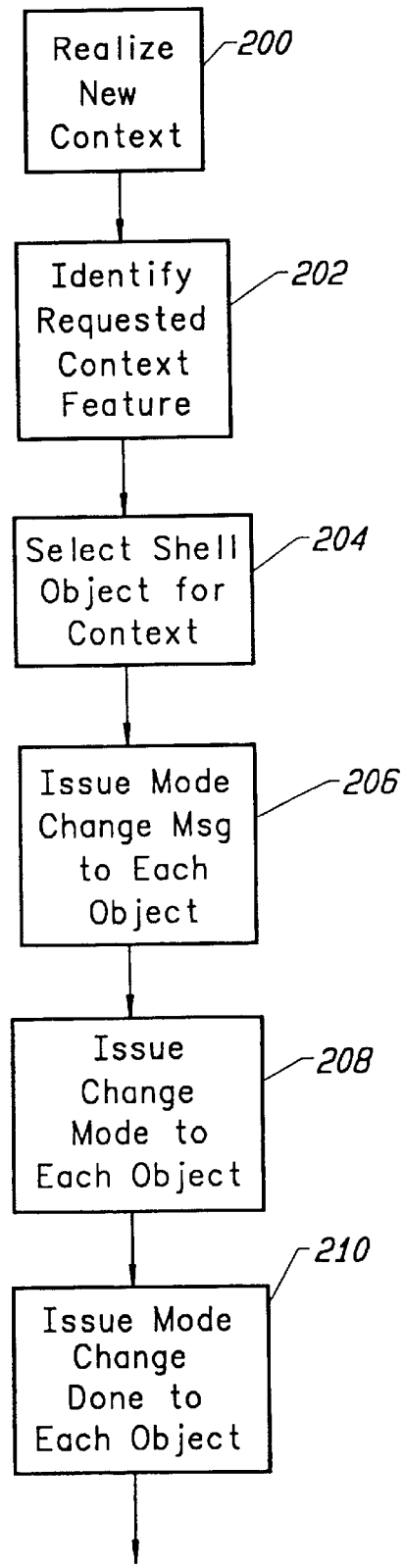
FIG. 6b provides a flow diagram describing the steps utilized in realizing a new context in accordance with a preferred embodiment of the present invention.

The process of performing a context switch occurs according to the process steps illustrated in FIGS. 6a and 6b. A context switch begins with a currently active context instantiation 150 of the shell object receiving an API call that at least inferentially specifies a mode change to an operating mode that requires persistence of some aspect of the current mode, such as a mode change to a color depth different from that of the current context. As before, the shell object 150 performs the initial validation of the operands of the API call, determines that a context switch is called for, and issues a create new context call 180 to the shell library 72'. The shell library 72' examines each of the existent instantiations of the shell object that may then exist within the context pool 148 to determine whether a context having the desired color depth already exists 184. If an instantiation of a shell object exists, such as shell object 152, with the desired color depth, the create new context call to the shell library 72' returns to the shell object 150.

If, however, the desired context does not then exist, a new shell object instantiation will be created 186. Prior to creation of this new shell object, if the context change is the first such change requiring support for a previously unsupported color depth, the shell library 72' may be modified to include support for the corresponding color depth conversion. In the preferred embodiment of the present invention, the shell library 72' is modified on creation of the second existent context to include support for all possible color depth conversions merely as a matter of convenience. Specifically, a routine for determining and converting between the current and target color depths is patched directly into the code of the shell library 72' so as to obviate the constant conditional testing of whether color depth conversion might be applicable to each and every drawing operation even when only a single context is in use.

The color depth routines of the present invention provide for on-the-fly conversion of device dependant bit maps between color depths of 8, 16, 24 and 32 bits. Translations between 16, 24 and 32 bit color depths are performed by directly mapping between the RGB color value tuples stored for each display pixel at the current display color depth. Translations from a palettized color space using an 8 bit per pixel color index are performed by first looking up the RGB color value tuple in the PDevice stored color palette and translation tables of the source application's context and then, again, performing a direct RGB color mapping to the current display color depth.

Conversion on the fly from a 16, 24 or 32 bit color depth to an 8 bit palettized form is somewhat more involved. The translation requires a search of the 8 bit color space for a best fit for each RGB tuple being converted. In general, a least mean square algorithm can be used to find a best fit color mapping. A significant performance improvement can be achieved by caching translated colors. For example, a basic cache table with 8,192 32 bit cache entries can be used in translating 32 bit RGB tuples to 8 bit palette index. Each 10 bit RGB value is precision reduced by three bits, resulting in a 21 bit tuple. Thus, an 8 bit palette index value, determined by doing an on the fly least mean square best fit match against the current color palette, can be cached with each 21 bit tuple to establish a quick conversion lookup table. Subsequent color conversions can then first search the table for pre-converted palette indices. Consequently, all color depth conversions can be directly supported by the shell library 72' as part of each API initiated drawing operation.

The instantiation of a new shell object is performed by calling the initialization routine of the shell interface module. As with the original initialization of the device driver 50, a new shell object instantiation, now shell object 152, is allocated and initialized. An initialization call is then made to the board library 74'. Since the board library 74', like the shell library 72', is a constant across all operating modes of the controller 19, the necessary references to the board library 74', as distinct from references to the individual hardware interface objects, are connected to the new shell object 152. The board library 74' then calls the initialization routines of each of the hardware interface modules in sequence to create new instantiations of the objects and to connect the objects to the board structure of the new shell object 152. Constants across color depth switches, such as the contents of the RegClassHandler structures of each of the modules may be either fully re-created or simply copied or referenced from the objects of the current context. For example, in the initialization of the Graphics hardware interface object 138, a new private hardware accelerator code data object may be created. The code stored by this data object could be initialization constants or sequencer code that will be downloaded to initialize the hardware accelerator of the graphics sub-element of the controller 19. Different sequencer code sets and sub-sets may thus be managed by the Graphics interface object in different contexts. This capability is of particular significance where the accelerator code might be dynamically swapable in the operation of the graphics sub-element within a single operating mode as required, perhaps, to adjust the acceleration algorithms for optimal execution of different drawing command sets. The board library initialization routine then returns to the shell library 72'.

The initialization routines of the remaining operating system interface modules are then called to complete the initialization of the new shell object 152. Each module creates a new instantiation of a corresponding interface object, creates any necessary private data space for the object, and then connects the object to the new shell object 152. In particular, the initialization of the Direct Draw operating system interface object 122 provides for the creation of a new context specific PDevice structure and, potentially, a new GDI_Infotable structure. As with the hardware interface objects, the data stored by these structures may be completely re-created or data from the corresponding structures of the current context can be used to initialize the new structures. However, the data in the new PDevice structure is specifically modified to define the color depth of the new context. Similarly, the pixel depth field of the GDI_Infotable is modified to reflect the new color depth as well. Pointers to these two new structures, which are thereafter managed by the shell library 72', are logically associated with the shell object 152 of the new context.

Consequently, a full compliment of both operating system and hardware interface objects is created to define a context that is logically distinct from the current context represented by the shell object 150. Execution then returns from the shell library 72' to the shell object 150.

The shell object 150 next issues 200 a call to the board library 72' to realize a new context. The shell object 150 provides operands sufficient to identify the characteristics of the new context including, in the preferred embodiment, the desired color depth and spatial resolution for the desired operating mode of the controller 19. In response, the shell library 72' searches the context pool 148 to select a shell object, such as shell object 152, that corresponds to the desired new context.

In preparation for actually performing the context switch, the shell library 72' then issues a mode set call with a "mode is about to change" operand to each interface object that will participate in the mode set 206. As before, each of the participating interface objects save any state related information into the corresponding private data spaces to ensure that such information will persist across not only the mode switch, but the context switch as well.

On the return from the last of the participating interface objects, the shell library 72' installs the new shell object 152 as the shell objects that defines the current context. Concurrently, the shell library 72' establishes the PDevice structure and GDI_Infotable structures logically associated with the shell object 152 as the structures that will be referenced by the operating system layer 54 in subsequent API calls to the device driver 50.

The parsing routine of the shell library 72' is then called to execute the instructions necessary to implement the mode switch. The processing and execution of these instructions are consistent with the necessary processing to implement a simple mode switch that does not involve a context switch by the device driver 50.

Once the mode set instructions have been executed, the shell library 72' issues a mode set call with a change mode operand to each of the participating objects. As before, each of the objects may execute any object specific routines necessary to implement or support the new operating mode of the controller 19, such as downloading new sequencer code to the graphics accelerator sub-element.

Finally, the shell library 72' issues a mode set call to each of the participating objects with a "mode has changed" operand. In response, each of the participating objects execute to establish the operating environment of the controller 19 including, for example, reallocating the use of memory in the display buffer 20 and establishing the position of the hardware cursor on the display 32. In addition, a call is made through the operating system object 128 to request a fall screen refresher. In response, the operating system kernel 56 coordinates a series of calls to the device driver 50 providing pointer references to the bit maps that are visible on the display 32. As each bit map is processed through the device driver 50, any required color depth translations are appropriately performed by the shell library 72'.

On return from the last participating object, the shell library 72' returns effectively through the shell object 152 to the operating system layer 54. Consequently, the device driver 50 has completed both a mode switch and context switch essentially independent of and without the involved participation of the application 60 or the operating system layer 54.

Figure 7:
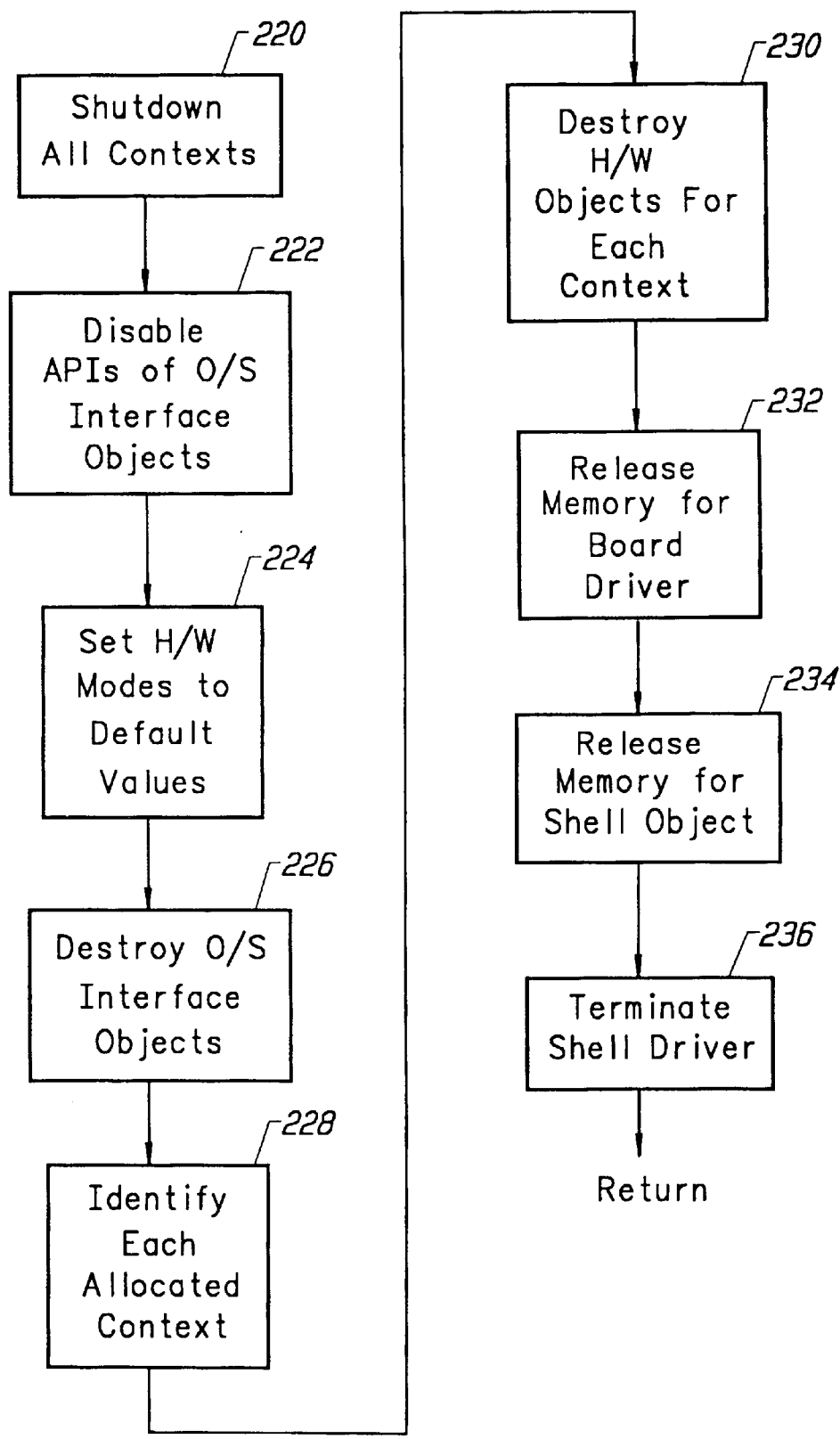
FIG. 7 provides a software flow diagram of the steps utilized in terminating the operation of a device driver constructed in accordance with the present invention.

VI. Operational State Termination:

Finally, the present invention provides for a process of terminating the operation of the device driver so, generally as shown in FIG. 7. Implementations of the operating system kernel 56, such as specifically Windows '95™, provide a shutdown API call as a standard call issued to each of the device drivers within a computer system 10 upon termination of the operating system kernel 56. On receipt of the shutdown API call, the shell object of the currently active context, such as shell object 152, operates to disable processing of any further API calls by the device driver 50 by terminating acceptance 222 of subsequently received API calls by the operating system interface modules. Consequently, the device driver 50 can then perform a shutdown in an orderly manner without being disturbed by the receipt of an unexpected API call.

A default section of the modes.dmm configuration file is then read and executed by the parsing routine of the shell library 72'. The instructions provided by this default section are utilized to set a default operating mode 224 for the controller 19. The controller 19 is thus established in a known stable state appropriate for potential use subsequent to the shutdown of the operating system kernel 56.

The shell library 72' then operates to free the system memory used by the interface objects and modules of the device driver 50. Specifically, the shell library 72' operates to identify each existent context of the device driver 50. For each identified context 228, the shell library 72' calls the board library 74' to sequentially free each of the hardware interface objects specific to the particular context 230. The board library 74', in turn, calls each hardware interface object associated with the shell object of the identified context. With the freeing of the last object associated with a hardware interface module, the memory space associated with both the object and module are freed. Once all of the hardware interface objects for all contexts have been freed, the board library 74' is again called to free its own memory 232.

The shell library 72' calls each of the operating system interface objects 234 for each existent context to free the memory space associated with the objects and corresponding modules. The shell objects defining the existent contexts of the device driver 50 are also freed. The shell library 72' then terminates 236, effectively freeing the associated memory, and execution returns to the operating system kernel 56 to continue termination of the operating system layer 54.

VII. Virtualized Driver Operation:

In the preferred Microsoft Windows '95 environment, a need exists to support legacy applications running in a so-called Dos-Box protected execution space. Protected execution, relevant to a preferred implementation of the present invention, is provided in either a full screen or a windowed mode. Legacy applications are permitted to directly access and program the controller 19 in the full screen mode. In the windowed mode, a virtualizing device driver, typically referred to as a VxD driver, is provided to emulate the hardware registers expected by the legacy application. In order to co-exist and co-execute with other windowed application, the VxD driver is expected to provide a window relative emulation of the hardware programming dynamically provided by the legacy application. Typically, VxD drivers are again implemented as singular monolithic software modules that support an emulation of the entirety of a specific implementation of a controller 19. Consequentially, conventional VxD drivers encounter the same problems associated with conventional device drivers.

Figure 8:
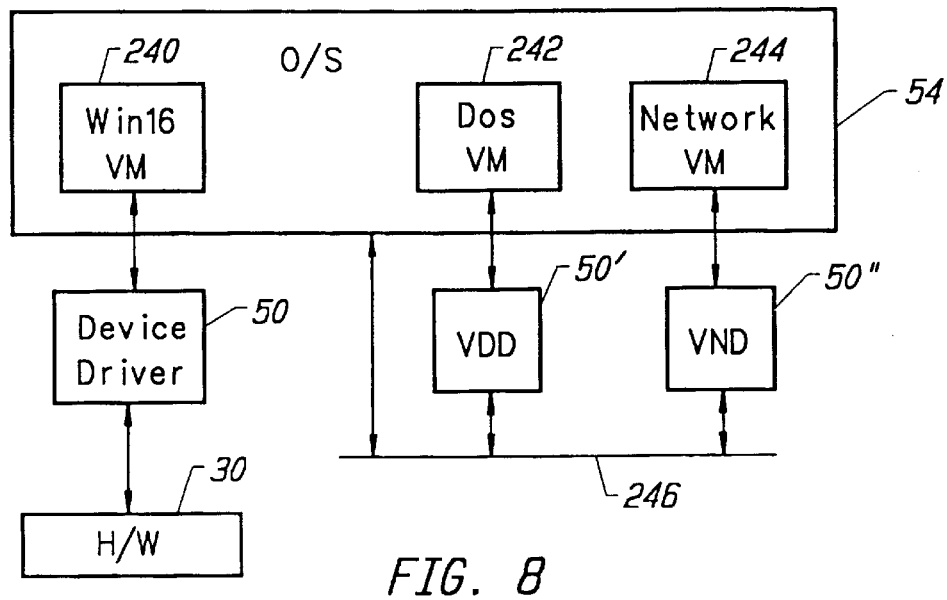
FIG. 8 provides a block diagram of illustrating the use of both real and virtual architectural configurations of the present invention in support of multiple virtual machines executing within an operating system consistent with the present invention.

As generally shown in FIG. 8, the architecture of the device driver 50 of the present invention can be directly and effectively adopted to implement VxD drivers, including specifically, a virtual display driver (VDD). A device driver 50 as described above preferably operates in support of a Windows (Win16) virtual machine (VM) 240 established in a conventional manner within the operating system layer 54. A Dos VM 242 provides the Dos-Box protected execution space for legacy applications that may attempt to directly access the hardware 30. A version 50' of the device driver 50 is provided to trap, evaluate and as appropriate emulate the consequences of hardware access attempts issued by or from within the Dos VM 242. The VDD 50', on becoming active in support of windowed mode execution of an application within the Dos VM 242, selectively establishes an access trap for the I/O or memory space corresponding to the register interface 30 through a conventional use of the operating system. This access trap is in general released when Dos VM 242 switches to a full screen mode or when execution moves to another virtual machine 240, 244. The access trap is reasserted when execution returns to the Dos VM 242 in the windowed mode or upon a switch from the full screen mode to the windowed mode.

Figure 9:
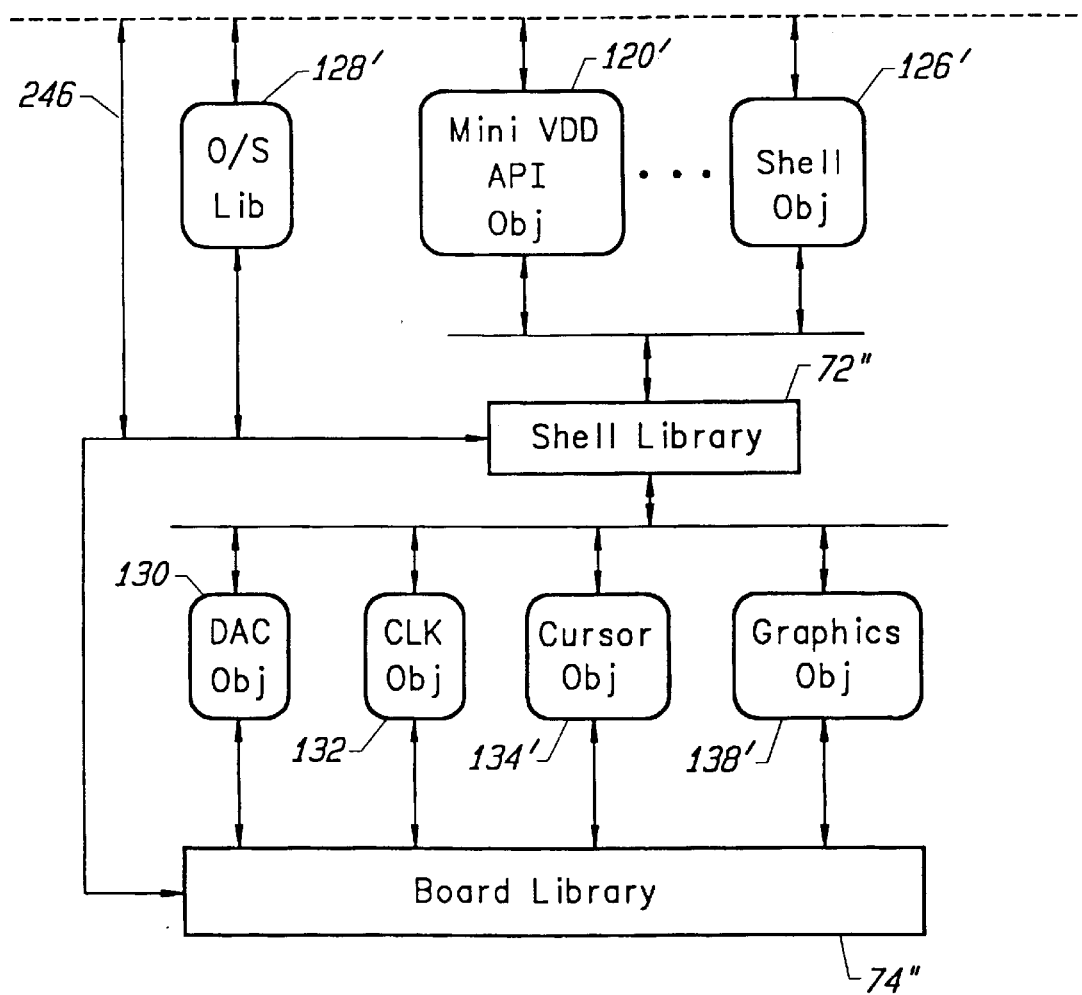
FIG. 9 provides a schematic block diagram of the architectural configuration of a virtual device driver constructed in accordance with the present invention.

Whenever the access trap detects an access attempt, the VDD 50' is provided the access characterizing information obtained by the trap. Specifically, the board library 74", as shown in FIG. 9, is provided with the access attempt information by the operating system 54 logically through the connection 246. Preferably, the components of the VDD 50' implement a single context version of the display driver 50. However, multiple contexts can be readily supported as appropriate to support multiple controllers 19 under the Dos VM 242.

Within a single context, the hardware interface objects 130', 132', 134', and 138' operate to store the access characterizing data so as to maintain a representation of the intended state of the display based on the successive attempts to directly access the hardware. Preferably, the RegClassMap structures associated with the hardware interface objects are augmented with pointers to storage space for the state information associated with each class of hardware sub-elements. The hardware interface objects also provide emulation routines that generate operating system calls with the assistance of the O/S object 128' to cause the display of a suitable representation of the intended screen appearance. These calls are applied to the operating system layer 54 and, in turn, suitably routed to the display driver 50. Upon a switch to a full screen mode, the display state maintained by the hardware interface objects can be used directly to establish the intended display state by applying the state data to the register interface 30.

The parser routine of the device driver 50' is used effectively in reverse to analyze the access characterizing information. Preferably, the access traps serve to characterize access attempts to device classes implicitly by the assignment of addresses to class trap handlers. Thus, the class, address and value provided with the access are collected by the trap handlers and provided to the reverse parser routine. Thus, with each trapped access attempt, the access related data is stored in the corresponding RegClassMap identified storage. The reverse parser also performs an analysis against the register definitions ultimately determined from the class register instructions stored in the modes.dmm file. The result of the analysis is a logical determination of whether the register intended to be written is an index register, or other management function register, or a data register. Where, the intended register is an index register or other management function register, the resulting change in state is recorded. Where the intended register is a data register, the new state of the register is recorded and then a determination is made as to whether some emulation is required. Depending on the particular register being written, no emulation may be required or the full index and data access operation may then be performed.

Consequently, substantially the same hardware and operating system interface object definitions are preferably used and, further, the same methods of selecting between multiple functions that support differing display characteristics can be used to select among display characteristic emulation routines implemented by the encapsulated hardware interface modules. Where the parser routine detects an identifiable mode set, the shell object 126' may be called via the O/S object 128' to perform a mode set operation as previously described. The substantially linear call sequences implemented by the operating system objects 120', 126' are directly enabled. The function call relation between the operating system interface objects and the remainder of the VDD 50' is therefore the same as in the case of the device driver 50.

VIII. Conclusion:

Thus, a highly optimal device driver architecture suitable for supporting a complex and multi-function peripheral controller as well as operating as a virtual device driver has been described. The architecture of the described device driver directly supports dynamic configuration of the device driver at load time to specifically match the hardware configuration of the peripheral controller as preferably determined directly from the hardware on a per-sub-element detailed basis, that employs a modular architecture specifically supporting functional isolation of module changes in correspondence with specifics sub-element designs, that provides for an efficient mechanism for performing mode switches of the operating state of the controller, that provides an efficient mechanism for maintenance and management of persistent data independent of mode switches through the support of independent context selectively with the performance of mode switches, and that provides for the efficient management of color depth transformation in video display controller applications. Furthermore, notwithstanding the modular complexity of the architecture, the supported inter-operative relationship between the modules enables substantially linearized call sequences to virtualize and implement the operating system API calls.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

What is claimed is:

1. A device driver supporting the virtualized execution of applications within a computer system, said device driver comprising:

a) an interface to an operating system that supports an access trap mechanism permitting said device driver to selectively establish an access trap for accesses by a predetermined application to a predetermined controller coupled to said computer system;

b) a predetermined set of mode set programs, each including a sequence of instructions defining programming accesses to said predetermined controller to establish a respective one of a like set of operating modes of said predetermined controller; and c) a parser routine for analyzing successive trapped access attempts by said predetermined application to said predetermined controller, said parser routine analyzing said successive trapped access attempts against said predetermined set of mode set programs to identify an intended operating mode of said predetermined controller, wherein said predetermined controller includes a plurality of functional sub-elements providing for the implementation of a like plurality of operational aspects of said controller, and wherein said device driver includes a like plurality of interface modules, each of said plurality of interface modules providing for the emulation of a corresponding one of said plurality of operational aspects defining said intended operating mode of said predetermined controller.

2. The device driver of claim 1 wherein said plurality of interface modules further selectively provide for the programming of respective ones of said plurality of functional sub-elements of said predetermined controller.

3. The device driver of claim 1, wherein each access includes access characterizing data and said interface modules further operate to store said access characterizing data.

4. The device driver of claim 3, wherein said access characterizing data includes class, address, and value information.

5. The device driver of claim 4, wherein said operating system is Windows '95™.

6. A method of providing emulation services in a virtualized execution space within a computer system, said method comprising the steps of:
   a) trapping access attempts to a predetermined register space;
   b) recording the access address and data provided in connection with each access attempt;
   c) providing the access address and data to a device driver corresponding to said predetermined register space;
   d) analyzing the access address and data against preestablished information defining a plurality of operating modes of a controller coupleable to said predetermined register space to identify an intended operating mode of said controller;
   e) storing said intended operating mode of said controller;
   f) providing an emulation of said intended operating mode;
   g) providing a plurality of device driver modules for respectively controlling a like plurality of sub-functions of said controller; and
   h) selectively enabling said plurality of device driver modules to emulate said plurality of sub-functions of said controller and enabling the trapping of access attempts to said predetermined register space.

7. A device driver supporting the virtualized execution of applications within a computer system, said device driver comprising:

an interface to an operating system that supports an access trap mechanism permitting said device driver to selectively establish an access trap for accesses by an application to a controller coupled to said computer system, wherein each access includes access characterizing information;

a parser operable to analyze said access characterizing information against pre-established information defining a plurality of operating modes of said controller to identify an intended operating mode of said controller; and a plurality of interface modules, wherein said controller includes a like plurality of functional sub-elements providing for the implementation of a like plurality of operational aspects of said controller, each of said plurality of interface modules selectively enablable to provide for the emulation of a corresponding one of said plurality of operational aspects defining said intended operating mode of said controller.

8. The device driver of claim 7, wherein said plurality of interface modules further selectively provide for the programming of respective ones of said plurality of functional sub-elements of said controller.

9. The device driver of claim 8, wherein said interface modules further operate to store said access characterizing data.

10. The device driver of claim 9, wherein said accesses by said application are to a register space in said controller.

11. The device driver of claim 10, wherein said access characterizing data includes class, address, and value information.

12. The device driver of claim 11, wherein said operating system is Windows '95™.

* * * * *